US011018610B2

(12) United States Patent
Chedygov et al.

(10) Patent No.: US 11,018,610 B2
(45) Date of Patent: May 25, 2021

(54) MOTOR DRIVE SYSTEM AND METHOD

(71) Applicant: Franklin Electric Co., Inc., Fort Wayne, IN (US)

(72) Inventors: Vladimir A. Chedygov, Tualatin, OR (US); Scott E. Leonard, Portland, OR (US); Dalton H. Paull, Portland, OR (US); Andre P. Perra, Portland, OR (US); Thomas W. Trullinger, Portland, OR (US)

(73) Assignee: Franklin Electric Co., Inc., Fort Wayne, IN (US)

( * ) Notice: Subject to any disclaimer, the term of this patent is extended or adjusted under 35 U.S.C. 154(b) by 0 days.

(21) Appl. No.: 16/480,811

(22) PCT Filed: Jan. 29, 2018

(86) PCT No.: PCT/US2018/015802
§ 371 (c)(1),
(2) Date: Jul. 25, 2019

(87) PCT Pub. No.: WO2018/140905
PCT Pub. Date: Aug. 2, 2018

(65) Prior Publication Data
US 2019/0393816 A1    Dec. 26, 2019

Related U.S. Application Data

(60) Provisional application No. 62/451,598, filed on Jan. 27, 2017, provisional application No. 62/451,447, filed on Jan. 27, 2017.

(51) Int. Cl.
*H02P 21/05*    (2006.01)
*H02P 21/22*    (2016.01)
(Continued)

(52) U.S. Cl.
CPC .............. *H02P 21/05* (2013.01); *F04B 17/03* (2013.01); *F04B 23/023* (2013.01); *H02K 5/20* (2013.01);
(Continued)

(58) Field of Classification Search
CPC .......... H02P 21/05; H02P 21/22; H02P 27/12; F04B 23/023; F04B 17/03
See application file for complete search history.

(56) References Cited

U.S. PATENT DOCUMENTS 1,795,014 A    3/1931   Dean
3,924,141 A    12/1975  Yannone et al.
(Continued)

FOREIGN PATENT DOCUMENTS

AU         769598       1/2000
AU      2015252162     11/2015
(Continued)

OTHER PUBLICATIONS

International Search Report for PCT/US2018/015802 dated Apr. 30, 2018, 3 pages.
(Continued)

*Primary Examiner* — Kawing Chan
*Assistant Examiner* — Bradley R Brown
(74) *Attorney, Agent, or Firm* — Faegre Drinker Biddle & Reath LLP

(57) ABSTRACT

A motor drive and method of controlling a motor are provided. The motor drive includes a controller generating a motor reference voltage; a DC bus providing a DC voltage having a ripple; an inverter including power switches operable to convert the DC voltage into an AC motor voltage by modulating the power switches during a plurality of switching cycles, the AC motor voltage based on the motor reference voltage; a capacitor circuit coupled to the DC bus
(Continued)

and having a maximum capacitance that is less than 10 microfarads per ampere of a rated current; and voltage prediction logic structured to: detect a voltage value corresponding of the ripple during each of the plurality of switching cycles; and modify the motor reference voltage during each of the plurality of switching cycles using the voltage value.

22 Claims, 26 Drawing Sheets

(51) Int. Cl.
| | |
|---|---|
| H02P 27/12 | (2006.01) |
| F04B 17/03 | (2006.01) |
| F04B 23/02 | (2006.01) |
| H02K 11/33 | (2016.01) |
| H02K 5/20 | (2006.01) |
| H02K 9/18 | (2006.01) |

(52) U.S. Cl.
CPC .............. *H02K 9/18* (2013.01); *H02K 11/33* (2016.01); *H02P 21/22* (2016.02); *H02P 27/12* (2013.01); *H02K 2205/09* (2013.01); *H02K 2213/06* (2013.01)

(56) References Cited

U.S. PATENT DOCUMENTS

| | | | |
|---|---|---|---|
| 4,052,648 A | 10/1977 | Nola | |
| 4,308,491 A | 12/1981 | Joyner et al. | |
| 4,623,830 A | 11/1986 | Peneder et al. | |
| 4,665,319 A | 5/1987 | Seepe et al. | |
| 4,742,424 A | 5/1988 | Kautzer et al. | |
| 4,967,096 A | 10/1990 | Diemer et al. | |
| 5,235,504 A | 8/1993 | Sood | |
| 5,422,550 A | 6/1995 | McClanahan et al. | |
| 5,473,497 A | 12/1995 | Beatty | |
| 5,721,449 A | 2/1998 | Panuce | |
| 5,747,955 A | 5/1998 | Rotunda et al. | |
| 5,784,236 A | 7/1998 | Tardiff | |
| 5,828,200 A | 10/1998 | Ligman et al. | |
| 5,897,781 A | 4/1999 | Dourdeville | |
| 6,045,331 A | 4/2000 | Gehm | |
| 6,045,332 A | 4/2000 | Lee | |
| 6,058,031 A | 5/2000 | Lyons | |
| 6,185,946 B1 | 2/2001 | Hartman | |
| 6,229,278 B1 | 5/2001 | Garces et al. | |
| 6,239,513 B1 | 5/2001 | Dean et al. | |
| 6,257,833 B1 | 7/2001 | Bates | |
| 6,313,602 B1 | 11/2001 | Arefeen | |
| 6,316,896 B1 | 11/2001 | Tikkanen et al. | |
| 6,459,175 B1 | 10/2002 | Potega | |
| 6,464,464 B2 | 10/2002 | Sabini et al. | |
| 6,551,065 B2 | 4/2003 | Lee | |
| 6,564,627 B1 | 5/2003 | Sabini | |
| 6,565,325 B2 | 5/2003 | Belehradek | |
| 6,585,041 B2 | 7/2003 | Crossley | |
| 6,586,900 B2 | 7/2003 | Rider | |
| 6,648,606 B2 | 11/2003 | Sabini | |
| 6,688,124 B1 | 2/2004 | Stark | |
| 6,688,320 B2 | 2/2004 | Frasure | |
| 6,697,244 B1 | 2/2004 | Bauer et al. | |
| 6,709,241 B2 | 3/2004 | Sabini | |
| 6,776,584 B2 | 8/2004 | Sabini | |
| 6,885,972 B2 | 4/2005 | Samata et al. | |
| 6,890,156 B2 | 5/2005 | Watson | |
| 6,897,583 B2 | 5/2005 | Doeffinger et al. | |
| 6,969,968 B2 | 11/2005 | Throngnumchai | |
| 6,981,940 B2 | 1/2006 | Rafferty | |
| 7,002,265 B2 | 2/2006 | Potega | |
| 7,010,393 B2 | 3/2006 | Mirsky | |
| 7,080,508 B2 | 7/2006 | Stavale | |
| 7,081,735 B1 | 7/2006 | Malkowski | |
| 7,085,116 B2 | 8/2006 | Kudo et al. | |
| 7,106,025 B1 | 9/2006 | Yin | |
| 7,112,037 B2 | 9/2006 | Sabini | |
| 7,161,456 B2 | 1/2007 | Knox | |
| 7,164,254 B2 | 1/2007 | Kerkman | |
| 7,173,393 B2 | 2/2007 | Maeda | |
| 7,246,500 B2 | 7/2007 | Singh et al. | |
| 7,266,001 B1 | 9/2007 | Notohamiprodjo | |
| 7,274,975 B2 | 9/2007 | Miller | |
| 7,387,602 B1 | 6/2008 | Kirsch | |
| 7,400,518 B2 | 7/2008 | Yin | |
| 7,432,618 B2 | 10/2008 | Taylor | |
| 7,437,215 B2 | 10/2008 | Anderson | |
| 7,460,378 B2 | 12/2008 | Faccin | |
| 7,477,037 B2 | 1/2009 | Amorino | |
| 7,480,544 B2 | 1/2009 | Wang | |
| 7,481,069 B2 | 1/2009 | Lifson et al. | |
| 7,508,160 B1 | 3/2009 | Rudniski | |
| 7,534,096 B2 | 5/2009 | Schulz | |
| 7,551,411 B2 | 6/2009 | Woods et al. | |
| 7,558,031 B2 | 7/2009 | Boren | |
| 7,598,628 B2 | 10/2009 | Zver | |
| 7,599,196 B2 | 10/2009 | Alexander | |
| 7,612,971 B2 | 11/2009 | Premerlani et al. | |
| 7,679,313 B2 | 3/2010 | Aiello et al. | |
| 7,680,561 B2 | 3/2010 | Rodgers et al. | |
| 7,706,151 B2 | 4/2010 | Neidorff et al. | |
| 7,733,678 B1 | 6/2010 | Notohamiprodjo et al. | |
| 7,739,882 B2 | 6/2010 | Evans | |
| 7,746,020 B2 | 6/2010 | Schnetzka et al. | |
| 7,746,624 B2 | 6/2010 | Rispoli et al. | |
| 7,748,450 B2 | 7/2010 | Mundell | |
| 7,764,041 B2 | 7/2010 | Schnetzka et al. | |
| 7,783,390 B2 | 8/2010 | Miller | |
| 7,800,339 B2 | 9/2010 | Gonzalez | |
| 7,817,384 B2 | 10/2010 | Woods et al. | |
| 7,839,201 B2 | 11/2010 | Jacobson | |
| 7,845,183 B2 | 12/2010 | Singh et al. | |
| 7,854,596 B2 | 12/2010 | Schnetzka | |
| 7,876,561 B2 | 1/2011 | Schnetzka et al. | |
| 7,911,816 B2 | 3/2011 | Miramonti | |
| 7,925,385 B2 | 4/2011 | Stavale | |
| 7,948,721 B2 | 5/2011 | Brunner | |
| 7,977,910 B2 | 7/2011 | Osman | |
| 7,990,740 B1 | 8/2011 | Notohamiprodjo et al. | |
| 8,014,110 B2 | 9/2011 | Schnetzka et al. | |
| 8,050,062 B2 | 11/2011 | Wagoner et al. | |
| 8,076,967 B2 | 12/2011 | Jacobson | |
| 8,107,267 B2 | 1/2012 | Tallam | |
| 8,134,323 B2 | 3/2012 | Leung | |
| 8,141,623 B2 | 3/2012 | Blecker | |
| 8,143,819 B2 | 3/2012 | Burd | |
| 8,156,757 B2 | 4/2012 | Doty | |
| 8,157,534 B2 | 4/2012 | Garcia | |
| 8,180,496 B2 | 5/2012 | Scoleri | |
| 8,192,171 B2 | 6/2012 | Mehaffey | |
| 8,209,057 B2 | 6/2012 | Judge | |
| 8,259,426 B2 | 9/2012 | Xiao | |
| 8,265,911 B1 | 9/2012 | Wu | |
| 8,303,260 B2 | 11/2012 | Stavale | |
| 8,328,523 B2 | 12/2012 | Kernan | |
| 8,333,265 B2 | 12/2012 | Kang et al. | |
| 8,384,338 B2 | 2/2013 | Lu | |
| 8,421,397 B2 | 4/2013 | Yu et al. | |
| 8,435,009 B2 | 5/2013 | Moore | |
| 8,436,559 B2 | 5/2013 | Kidd | |
| 8,456,116 B2 | 6/2013 | Burdick | |
| 8,495,890 B2 | 7/2013 | Jadric et al. | |
| 8,503,180 B2 | 8/2013 | Nojima | |
| 8,517,692 B2 | 8/2013 | Hopwood | |
| 8,538,593 B2 | 9/2013 | Sun et al. | |
| 8,545,189 B2 | 10/2013 | Venkatachari | |
| 8,561,805 B2 | 10/2013 | Scott et al. | |
| 8,564,233 B2 | 10/2013 | Kidd | |
| 8,594,851 B1 | 11/2013 | Smaidris | |
| 8,629,637 B2 | 1/2014 | Blasko | |
| 8,670,255 B2 | 3/2014 | Gong et al. | |
| 8,684,078 B2 | 4/2014 | Boyles | |
| 8,714,253 B2 | 5/2014 | Sherwood | |

(56) References Cited

U.S. PATENT DOCUMENTS

| | | |
|---|---|---|
| 8,714,933 B2 | 5/2014 | Komatsu |
| 8,727,737 B2 | 5/2014 | Seitter |
| 8,737,097 B1 | 5/2014 | Swamy |
| 8,774,972 B2 | 7/2014 | Rusnak |
| 8,779,698 B2 | 7/2014 | Havard |
| 8,810,349 B2 | 8/2014 | Owen |
| 8,853,974 B2 | 10/2014 | Devos et al. |
| 8,876,495 B2 | 11/2014 | Galloway |
| 8,903,560 B2 | 12/2014 | Miller |
| 8,907,643 B2 | 12/2014 | Sreenivas |
| 8,937,796 B2 | 1/2015 | Xiao |
| 8,937,822 B2 | 1/2015 | Dent |
| 8,976,526 B2 | 3/2015 | Kulkarni |
| 9,018,882 B2 | 4/2015 | Mack |
| 9,027,717 B2 | 5/2015 | Hult |
| 9,032,748 B2 | 5/2015 | Lau |
| 9,033,676 B2 | 5/2015 | Palka |
| 9,071,078 B2 | 6/2015 | Rockenfeller et al. |
| 9,085,412 B1 | 7/2015 | Sasakura |
| 9,088,241 B2 | 7/2015 | Wu et al. |
| 9,127,536 B2 | 9/2015 | Hill |
| 9,127,774 B2 | 9/2015 | Wilde |
| 9,153,374 B2 | 10/2015 | Kulkarni et al. |
| 9,181,953 B2 | 11/2015 | Steger |
| 9,228,750 B2 | 1/2016 | Rockenfeller |
| 9,234,517 B2 | 1/2016 | Wentworth |
| 9,287,812 B2 | 3/2016 | Nondahl et al. |
| 9,294,019 B2 | 3/2016 | Liu et al. |
| 9,301,422 B1 | 3/2016 | Tate |
| 9,318,976 B1 | 4/2016 | Wei et al. |
| 9,337,762 B1 | 5/2016 | Gibbs |
| 9,341,178 B1 | 5/2016 | Williams |
| 9,360,848 B2 | 6/2016 | Bonnelye |
| 9,404,426 B2 | 8/2016 | Wichmann et al. |
| 9,404,500 B2 | 8/2016 | Stiles |
| 9,410,410 B2 | 8/2016 | Broussard |
| 9,453,505 B2 | 9/2016 | Stephens |
| 9,461,565 B2 | 10/2016 | Osman |
| 9,490,738 B2 | 11/2016 | Nondahl et al. |
| 10,566,881 B2 | 2/2020 | Lauw et al. |
| 10,594,246 B2 | 3/2020 | Li et al. |
| 2003/0099668 A1 | 5/2003 | Jadric et al. |
| 2004/0070939 A1 | 4/2004 | Peng |
| 2005/0116814 A1 | 6/2005 | Rodgers et al. |
| 2005/0189889 A1* | 9/2005 | Wirtz ............... H05K 7/1432 318/105 |
| 2006/0225445 A1 | 10/2006 | Lifson et al. |
| 2006/0267542 A1 | 11/2006 | Wei et al. |
| 2006/0284675 A1* | 12/2006 | Krochmal ........... H03F 1/3264 330/149 |
| 2007/0007929 A1 | 1/2007 | Lee et al. |
| 2007/0008076 A1 | 1/2007 | Rodgers et al. |
| 2007/0010916 A1 | 1/2007 | Rodgers et al. |
| 2007/0256437 A1 | 11/2007 | Singh et al. |
| 2008/0165456 A1 | 7/2008 | Ganev et al. |
| 2008/0205001 A1 | 8/2008 | Saito et al. |
| 2009/0140678 A1 | 6/2009 | Nakao |
| 2009/0228149 A1 | 9/2009 | Alston |
| 2010/0034665 A1 | 2/2010 | Zhong |
| 2010/0310382 A1 | 12/2010 | Kidd |
| 2010/0314881 A1 | 12/2010 | Stone |
| 2011/0030414 A1 | 2/2011 | Newell et al. |
| 2012/0183413 A1 | 7/2012 | Igarashi |
| 2012/0230846 A1 | 9/2012 | Stephens |
| 2012/0242273 A1 | 9/2012 | Hsieh et al. |
| 2013/0235494 A1* | 9/2013 | Holce ............... H02P 27/047 361/31 |
| 2014/0005849 A1 | 1/2014 | Sun et al. |
| 2014/0043870 A1 | 2/2014 | Swamy |
| 2014/0081429 A1 | 3/2014 | Miles |
| 2014/0084687 A1 | 3/2014 | Dent |
| 2014/0119953 A1 | 5/2014 | Larsson |
| 2014/0180485 A1 | 6/2014 | Stavale |
| 2014/0204614 A1* | 7/2014 | Elam ............... H02M 7/21 363/16 |
| 2014/0210391 A1 | 7/2014 | Bozic et al. |
| 2014/0254217 A1 | 9/2014 | Li et al. |
| 2014/0262245 A1 | 9/2014 | Hill |
| 2014/0271253 A1 | 9/2014 | Scheffer |
| 2014/0286792 A1 | 9/2014 | Streefkerk |
| 2014/0309796 A1 | 10/2014 | Mueller |
| 2014/0369854 A1 | 12/2014 | Fullemann |
| 2014/0379300 A1 | 12/2014 | Devine |
| 2015/0042187 A1 | 2/2015 | Bradfield |
| 2015/0114652 A1 | 4/2015 | Lestz |
| 2015/0115854 A1 | 4/2015 | Pottenbaum et al. |
| 2015/0175013 A1 | 6/2015 | Cryer |
| 2015/0207319 A1 | 7/2015 | Miller |
| 2015/0211512 A1 | 7/2015 | Wiegman |
| 2015/0211524 A1 | 7/2015 | Broussard |
| 2015/0252661 A1 | 9/2015 | Glass |
| 2015/0300346 A1 | 10/2015 | Patel |
| 2015/0311853 A1* | 10/2015 | Swamy ............... H02M 1/15 318/504 |
| 2016/0131712 A1 | 5/2016 | Bock et al. |
| 2016/0249491 A1 | 8/2016 | Wang et al. |
| 2017/0070162 A9 | 3/2017 | Dent |
| 2017/0149364 A1 | 5/2017 | Wu et al. |
| 2019/0052210 A1* | 2/2019 | Li ............... H02P 27/12 |
| 2020/0177116 A1 | 6/2020 | Lauw et al. |

FOREIGN PATENT DOCUMENTS

| | | |
|---|---|---|
| BR | P10312493 | 1/2012 |
| CA | 2598485 | 10/2006 |
| EP | 0289268 | 11/1988 |
| EP | 1678587 | 7/2006 |
| EP | 2301143 | 11/2011 |
| EP | 3014754 | 5/2016 |
| KR | 101258911 | 4/2013 |
| KR | 20160002957 | 1/2016 |
| WO | 20051040992 A2 | 5/2005 |
| WO | 2006109352 | 2/2006 |
| WO | 2007086722 | 8/2007 |
| WO | 2009020402 | 2/2009 |
| WO | 20091150464 A1 | 12/2009 |
| WO | 2012069892 | 5/2012 |
| WO | 2014181237 | 11/2014 |
| WO | 20141206341 A1 | 12/2014 |
| WO | 2015186046 | 12/2015 |
| WO | 2016127136 | 8/2016 |

OTHER PUBLICATIONS

Written Opinion for PCT/US2018/015802 dated Apr. 30, 2018, 4 pages.
Jim Reinwald, Lenze MC1000 Manual, dated Aug. 20, 1997, 82 pages.
Reliance Electric, LiquiFlo AC General Purpose and Vector Duty Drive Software Start-Up and Reference Manual, Jun. 2002, 226 pages.
Franklin Control Systems, Q-Link Variable Frequency Drive, 125 pages.
Jingbo Liu, Thomas Nondahl, Peter Schmidt, Semyon Royak and Timothy Rowan, Generalized Stability Control for Open-Loop Operation of Motor Drives, vol. 53, No. 3, May/Jun. 2017, 9 pages.
Yue Zhao, Wei Qiao and Long Wu, Position Extraction from a Discrete Sliding-Mode Observer for Sensorless Control of IPMSMs, Faculty Publications from the Department of Electrical Engineering, 2012, 7 pages.
Yue Zhao, Wei Qiao and Long Wu, An Adaptive Quasi-Sliding-Mode Rotor Position Observer-Based Sensorless Control for Interior Permanent Magnet Synchronous Machines, Faculty Publications from the Department of Electrical Engineering, 2013, 13 pages.
Kevin Lee, Wenxi Yao, Bin Chen, Zhengyu Lu, Anbo Yu, and David Li, Stability Analysis and Mitigation of Oscillation in an Induction Machine, vol. 50, No. 6, Nov./Dec. 2014, 10 pages.
Xiyou Chen and Mehrdad Kazerani, Space Vector Modulation Control of an AC-DC-AC Converter With a Front-End Diode Rectifier and Reduced DC-link Capacitor, vol. 21, No. 5, Sep. 2006, 9 pages.

(56) References Cited

OTHER PUBLICATIONS

Hideaki Iura, Kozo Ide, Tsuyoshi Hanamoto and Zhe Chen, An Estimation Method of Rotational Direction and Speed for Free-Running AC Machines Without Speed and Voltage Sensor, vol. 47, No. 1, Jan./Feb. 2011, 8 pages.
International Preliminary Report on Patentability received for PCT Patent Application No. PCT/US2018/015797, dated Aug. 8, 2019, 9 pages.
International Preliminary Report on Patentability received for PCT Patent Application No. PCT/US2018/015802, dated Aug. 8, 2019, 6 pages.
International Search Report and Written Opinion received for PCT Patent Application No. PCT/US2018/015797, dated May 30, 2018, 11 pages.
International Search Report and Written Opinion received for PCT Patent Application No. PCT/US2018/015802, dated Apr. 30, 2018, 6 pages.
International Search Report for PCT/US2018/015797 dated May 30, 2018, 5 pages.
Written Opinion for PCT/US2018/015797 dated May 30, 2018, 5 pages.

* cited by examiner

MOTOR DRIVE SYSTEM AND METHOD

CROSS-REFERENCE TO RELATED APPLICATIONS

The present application is a National stage application filed under 37 CFR § 371 of International Application No. PCT/US2018/015802, filed on Jan. 29, 2018, which claims the benefit of U.S. Provisional Patent Applications Nos. 62/451,447 and 62/451,598, filed Jan. 27, 2017, all of which are incorporated herein by reference in their entirety.

FIELD OF THE DISCLOSURE

The disclosure relates generally to a system and a method for driving a motor. More particularly, the disclosure relates to a system and method for adaptively controlling an operating characteristic of the motor.

BACKGROUND OF THE DISCLOSURE

A motor drive generates motor voltages to control the speed of a motor coupled to a load. The load may comprise a variable torque or a constant torque load. Example loads include pumps, fans, compressors, vehicles, conveyors, material processing machines such as extruders, blenders, dryers, printers, and others. Example pumps comprise vacuum pumps, submersible pumps, surface pumps, centrifugal and progressive cavity pumps, and any other mechanical device rotatably operable to transfer fluids. Pumps are used in many applications, including liquid pumping applications, heating, ventilation and air conditioning (HVAC) applications, cooling tower applications, and others.

Liquid pumping systems use motors to drive pumps and transfer liquids from supply reservoirs, such as wells. A sensor measures a characteristic of the liquid, and a motor drive controls the motor to maintain the characteristic near its setpoint. In some systems, the motor drive measures pressure in a fluid circuit and controls the speed of the motor to maintain the pressure near its setpoint. The pump must operate against the well head. Wells can be deep or shallow, and the fluid level within each well varies. The pump pressure can therefore be significantly higher than the pressure sensed by the pressure sensor. The pump pressure can vary significantly between installations and also within the same installation as the level of the fluid in the well rises or falls.

In view of the multitude of applications in which motors can be used, it would be desirable to be able to drive a motor with a motor drive regardless of the motor's type, size, and application, while enabling a user to configure or reconfigure the motor drive in the field.

SUMMARY

Embodiments of a variable frequency drive (VFD) and a method of control a motor are provided herein. In some embodiments, a VFD includes a controller generating a motor reference voltage; a DC bus providing a DC voltage having a ripple; an inverter including power switches operable to convert the DC voltage into an AC motor voltage by modulating the power switches during a plurality of switching cycles, the AC motor voltage based on the motor reference voltage; a capacitor circuit coupled to the DC bus and having a maximum capacitance that is less than 10 microfarads per ampere of a rated current; and voltage prediction logic structured to: detect a voltage value corresponding of the ripple during each of the plurality of switching cycles; and modify the motor reference voltage using the detected voltage values during each of the plurality of switching cycles to reduce a total harmonic distortion (THD) of the AC motor voltage.

In some embodiments, a VFD includes a controller generating a motor reference voltage; a DC bus providing a DC voltage having a ripple; an inverter including power switches operable to convert the DC voltage into an AC motor voltage by modulating the power switches during a plurality of switching cycles, the AC motor voltage based on the motor reference voltage; a capacitor circuit coupled to the DC bus and having a maximum capacitance that is less than 10 microfarads per ampere of a rated current; and voltage prediction logic structured to: detect a voltage value corresponding of the ripple during each of the plurality of switching cycles; and modify the motor reference voltage using the detected voltage values during each of the plurality of switching cycles to reduce a total harmonic distortion (THD) of the AC motor voltage; and stabilization logic structured to: sum unfiltered q-axis and d-axis currents derived from the AC motor voltage; low-pass filter the summed currents to generate a feedback signal; and modify a q-axis stator voltage based on the feedback signal.

In some embodiments, a method of controlling a VFD comprises determining a frequency of a motor voltage generated by an inverter; and bumping a pressure setpoint to determine whether to enter a sleep mode of operation at intervals based on the frequency of the VFD determined prior to bumping the pressure setpoint, wherein the controller in the sleep mode of operation the inverter does not generate the motor voltage.

DESCRIPTION OF THE DRAWINGS

The features and advantages of the disclosure will become more readily appreciated as the same become better understood by reference to the following detailed description when taken in conjunction with the accompanying drawings, where:

FIGS. 19A-19C and 20A-20C are screenshots of a graphical user interface of a mobile application reporting module structured to generate a start-up report;

FIGS. 22A-22C and 23A-23B are screenshots of a graphical user interface of a mobile application setup guide structured to setup a motor drive to control a motor and to test a rotation of the motor;

Figure 1:
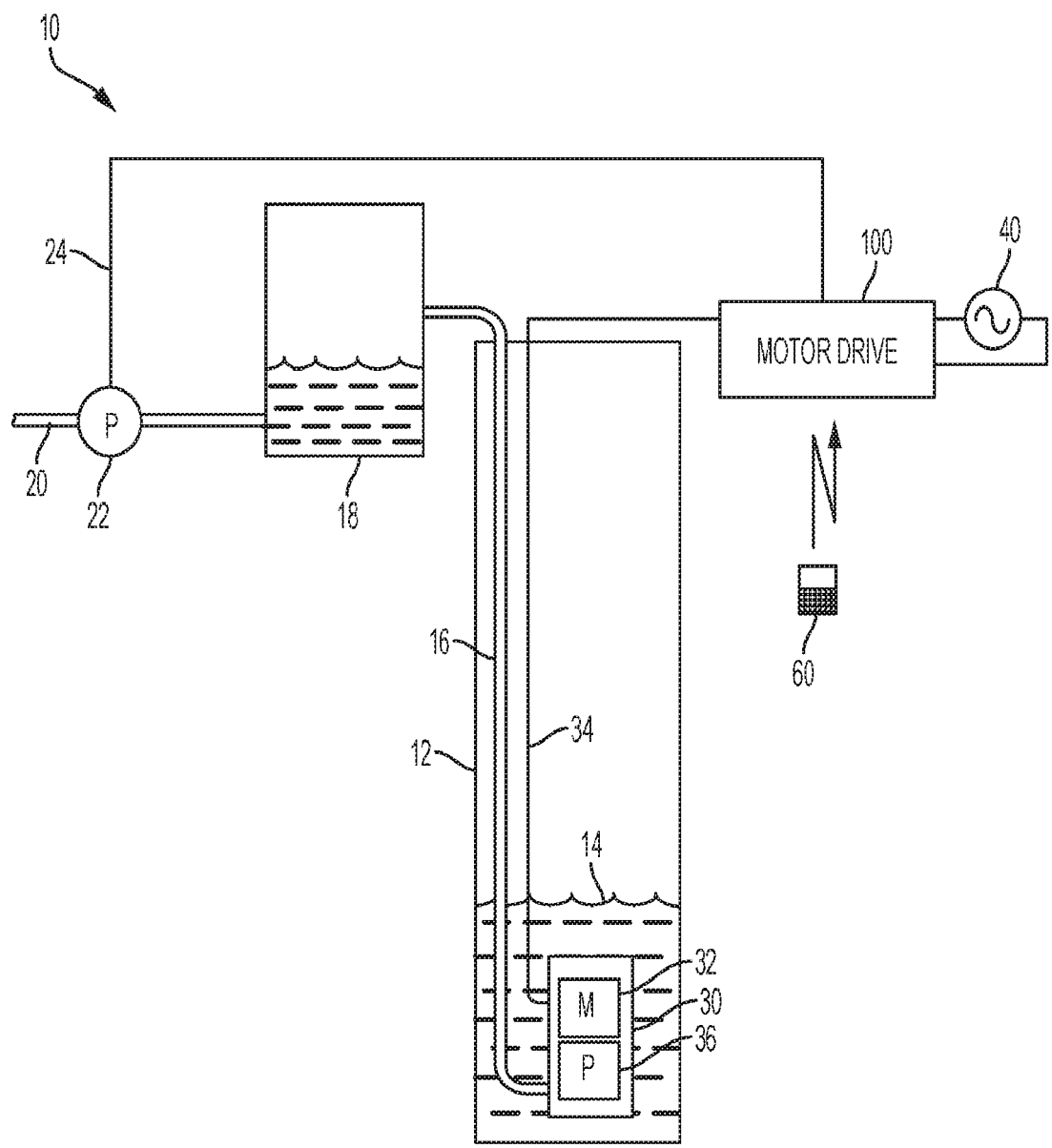
FIGS. 1, 2 and 3 are diagrammatic representations of embodiments of liquid pumping systems comprising, respectively, a submersible motor, a surface motor, and a surface motor coupled to a booster pump.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention.

DETAILED DESCRIPTION OF DISCLOSED EMBODIMENTS

For the purpose of promoting an understanding of the principles of the invention, reference will now be made to the embodiments illustrated in the drawings, which are described below. The embodiments disclosed below are not intended to be exhaustive or limit the invention to the precise form disclosed in the following detailed description.

Except where a contrary intent is expressly stated, terms are used in their singular form for clarity and are intended to include their plural form.

As used herein, the terms "comprises," "comprising," "containing," and "having" and the like denote an open transition meaning that the claim in which the open transition is used is not limited to the elements following the transitional term. The terms "consisting of" or "consists of" denote closed transitions.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Occurrences of the phrase "in one embodiment," or "in one aspect," herein do not necessarily all refer to the same embodiment or aspect.

Embodiments of the disclosure, and others, will now be described with reference to the figures. Referring to FIG. 1, a diagrammatic representation of a liquid supply or pump system 10 is disclosed. Example liquids include water, gasoline fuel, diesel fuel, petroleum, oil, sewage, and combinations of such liquids with gases and solids, such as water and coal-based methane gas. Although the embodiments below may be described with reference to water, the invention is not so limited and the principles and advantages thereof may be applicable to any liquid or, more generally, to any fluid. The liquid supply system comprises a reservoir 12 containing water 14 which is pumped by a pump unit 30 through a conduit 16, optionally via another reservoir 18, e.g. a pressure tank, to a conduit 20 of a closed system. A submersible or immersive pump unit 30 includes a pump 36 driven by a motor 32 which is powered by a motor drive 100 via power conductors 34. The size of reservoir 12, which is interposed between pump unit 30 and a pressure sensor or transducer 22, affects the response of the system. In one example, the motor drive 100 is a variable frequency drive and pump 36 is a helical rotor pump. Motor drive 100 may be referred to hereinafter as "the VFD". Examples of helical rotor pumps include progressive cavity pumps and centrifugal pumps. Power conductors 34 may comprise two or more wires to provide single or three phase power to motor 32.

During operation of the system, water 14 flows out of conduit 20. For example, the system may be a water system in a home, in which case water flows out of conduit 20 when a faucet is opened or an irrigation system is turned on. Constant pressure ensures the heads of the irrigation system spray at a constant distance from the head to provide even and predictable irrigation. Fluid characteristics including pressure may be monitored with the pressure sensor 22 disposed in conduit 20 to generate a pressure signal useful to maintain pressure about a setpoint. The pressure signal is provided via line 24 connecting the pressure sensor 22 and motor drive 100. An input device 60 is also shown. Input device 60 is provided to receive, from a user, input parameters such as setpoints and schedules. Input device 60 may comprise a smart device wirelessly coupled to motor drive 100. Example smart devices include computers, smart phones and tablets. Reservoir 12 may be an aboveground or underground tank, a well casing, or any other reservoir containing water 14.

Figure 2:
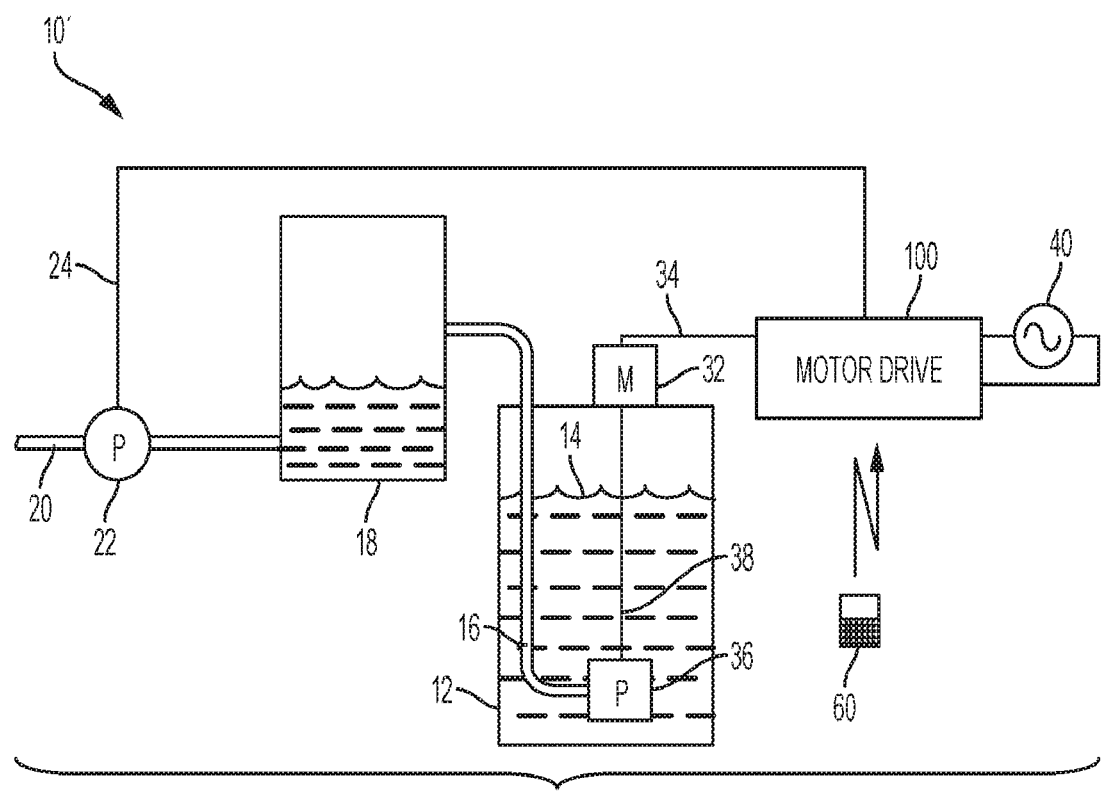
Figure 3:
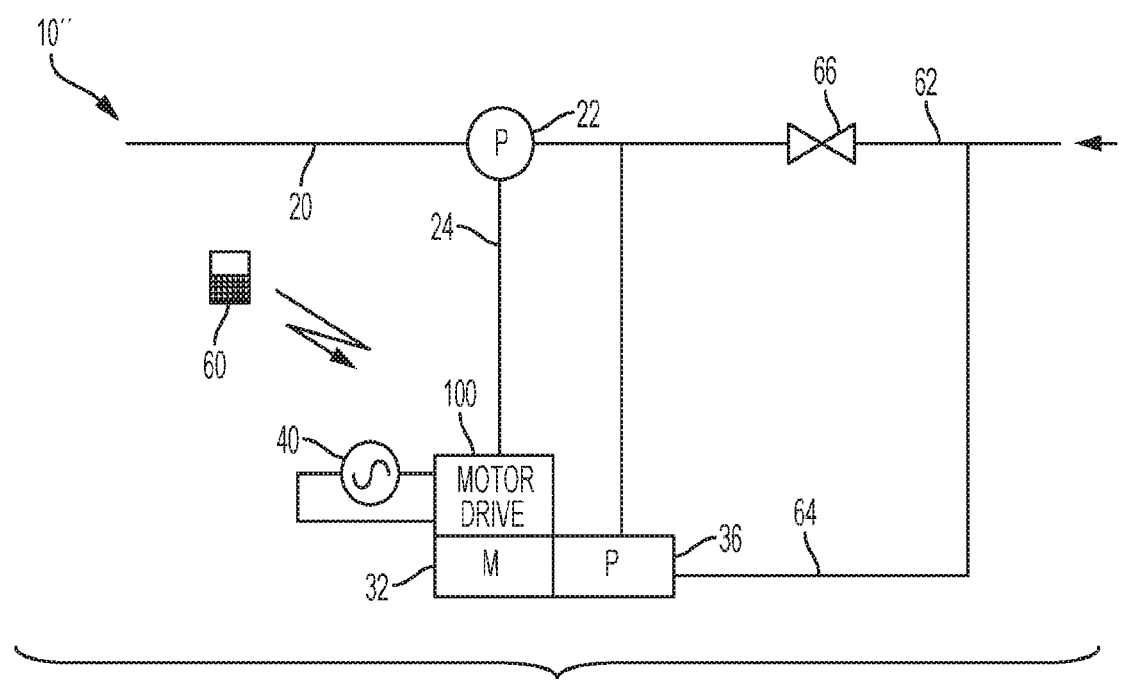

FIG. 2 illustrates an embodiment of a liquid supply system 10'. Unlike in the first embodiment, motor 32 is not submersible and is therefore disposed adjacent the earth's surface. A shaft 38 couples motor 32 and pump 36. In this configuration, pump 36 is powered by shaft 38 under the action of motor 32, which is driven by motor drive 100. FIG. 3 illustrates an embodiment of a liquid supply system 10". In this embodiment, pump 36 is provided to boost a main line pressure. The main line comprises two branches, 62 and 64, and a pressure valve 66. When the pressure in the main line is too low to open pressure valve 66, water can only flow through pump 36, which is driven by motor 32 and motor drive 100 to boost the pressure of the main line (i.e. its inlet pressure). Thus, motor drive 100 may be configured to suit different applications.

Figure 4:
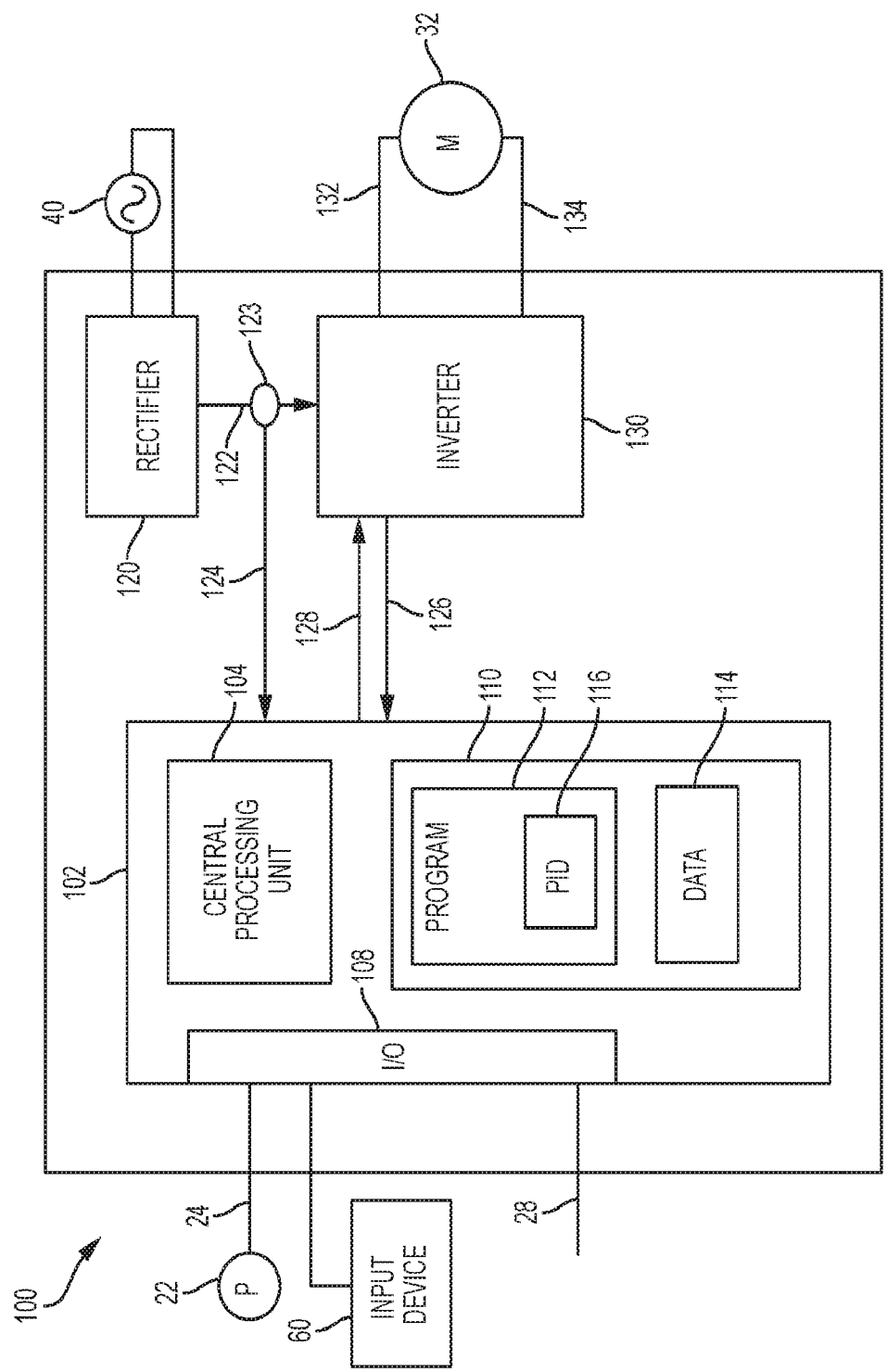
FIG. 4 is a block diagram of an embodiment of a motor drive operable in the liquid pumping systems shown in FIGS. 1 to 3.

FIG. 4 illustrates an embodiment of motor drive 100 comprising a processing device, illustratively controller 102, a rectifier 120 and an inverter 130. As shown, controller 102 includes a control processing unit (CPU) 104 configured to access a memory device 110 and execute processing instructions from a software application, exemplified by program 112, based on data 114. Techniques for generating motor voltages according to characteristics of a control signal are known in the art. In one example, a technique comprises storing values in a table corresponding to samples of an operating curve. The operating curve is typically a substantially straight line defining a volts-hertz relationship. When the speed control system determines a desired operating speed, which defines an operating frequency, the motor drive 100 looks up a voltage corresponding to the frequency. The motor drive 100 then generates a motor voltage based on the voltage and the frequency. In another example, a formula or a function embodying the operating curve characteristics is used by CPU 104 to generate the desired motor voltages.

Rectifier 120 is powered by a power source 40 and includes any rectification circuit well known in the art, e.g., a diode bridge, to convert alternating-current (AC) voltage supplied by power source 40 into direct-current (DC) voltage which it supplies to inverter 130. Inverter 130 receives DC power from rectifier 120 through a conductor 122 and converts the DC power into an AC motor power. Power source 40 may comprise a single phase two-wire supply, a single phase three-wire supply, or a three phase supply. A single phase two-wire supply is shown.

CPU 104 receives inputs through an input/output (I/O) interface 108. I/O interface 108 is configured to receive an input pressure signal via line 24 from pressure sensor 22 and to provide an output pressure signal via line 28. In some embodiments, I/O interface 108 comprises suitable digital-to-analog converters (DACs) to convert a signal from controller 102 into the output pressure signal. Generally, the output pressure signal is scaled to have an industry standard 0-10 volt range or a 4-20 mA range. In other embodiments, the output pressure signal is a digital signal which may be transmitted via a serial communications bus. In some embodiments, the output pressure signal is proportional to the input pressure signal. The proportional relationship may comprise a 1:1 relationship or another relationship. In some embodiments, the relationship between the input pressure signal and the output pressure signal comprises a proportional component and an integral component. In some embodiments, the relationship between the input pressure signal and the output pressure signal comprises a proportional component, an integral component, and a derivative component (e.g. a PID control loop). A proportional-integral-derivative (PID) controller 116 is shown which may be logically coupled to receive the input pressure signal and structured to generate a signal for I/O 108 corresponding to the output pressure signal. The output pressure signal may be coupled to another motor drive, as described below.

CPU 104 outputs a control signal over line 128 to inverter 130. In one example, the control signal is provided to a pulse-width-modulated (PWM) module having power switches and control logic which generates the appropriate gating signals for the power switches to convert the DC power supplied by rectifier 120 to the AC motor voltage suitable to drive the motor according to the control signal, provided to the motor via conductors 132, 134. Current drawn by inverter 130 from rectifier 120 is sensed by a current sensor 123 and a current signal is provided by current sensor 123 to CPU 104 by conductor 124. Motor voltage feedback can also be provided, for example, through a conductor 126 connecting inverter 130 and controller 102. Motor voltages may also be generated with other known or later developed drive topologies programmed in accordance with embodiments of the disclosure.

In a more general embodiment, the controller comprises control logic operable to generate the control signal. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

In a motor driven by a variable frequency drive, torque may be calculated as follows:

$$T = \frac{\sqrt{3} \times V \times I \times PF}{\omega}$$

$T$-Torque $V$-Voltage $I$-Current $PF$-Power Factor $\omega$-rotational speed

The torque also has a proportional relationship to the motor's current and is influenced by the actual operating point. As an illustration, the current is also influenced by the speed or rather total load on the shaft. Additionally, the load and magnetization component of the current are to be separated so that the load component can be used to establish the correlation. Accordingly, a desired torque level can be caused by controlling the voltage and current according to the present load.

Stabilization Features

The VFD may comprise one or more features to increase stability and smooth operation of the motor while reducing the VFD's size and increasing its reliability. The VFD may comprise reduced capacitance, which reduces the space requirements of the VFD due to the reduced size of the capacitors. In one example, a reduced capacitance VFD uses 40 microfarad capacitors instead of capacitors greater than 700 microfarad. The smaller capacitors can also be manufactured by methods that result in increased reliability of the capacitor. Reduced capacitance is generally in the order of 2-3 microfarads per ampere whereas typically capacitance is in the order of 40 microfarads per ampere of DC-bus current.

1. Ripple Reduction

Small capacitance can result in a significant 360 Hz ripple (denoted by Tr in FIG. 5) coming from the grid voltage. To supply the motor with a smooth, substantially ripple-free voltage, the VFD should ideally be controlled based on the instantaneous DC-bus voltage. However, in practice there are multiple factors (such as the LPF delay, ADC delay, feedback loop delay, control and switching loop delay, . . . ) that could contribute a material amount of delay between the moment that the DC-bus voltage is sensed to the time that it is processed and used. This unwanted delay could potentially deteriorate the quality of the VFD's output voltage by creating undesirable ripple, noise, and harmonics. To mitigate this undesirable distortion, voltage prediction logic implements a voltage prediction method to compensate for the aforementioned time-delay or phase-shift.

Figure 5:
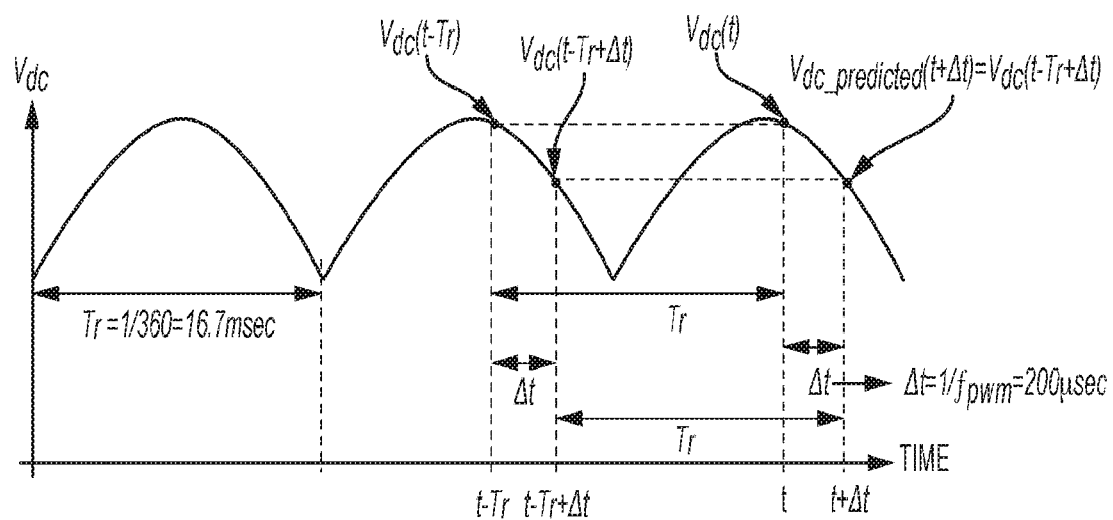
FIGS. 5 and 6 are, respectively, a timing diagram and a block diagram provided to illustrate the functionality of ripple-reduction logic in accordance with one embodiment of a motor drive configured to reduce voltage ripple.
Figure 6:
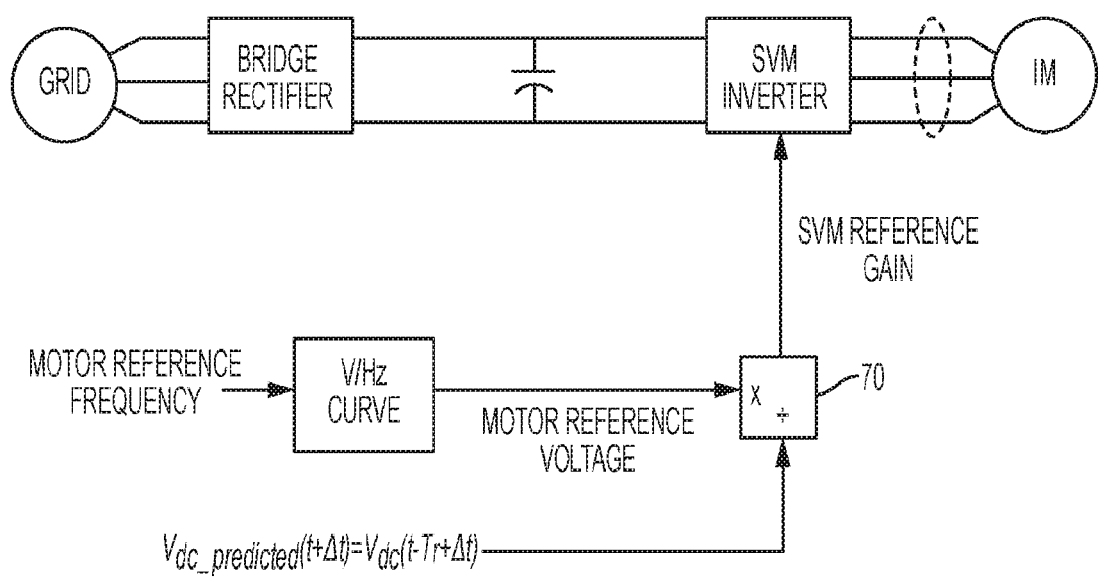

The control logic monitors the DC bus voltage and detects a cyclic characteristic of the ripple in the bus voltage. FIG. 5 is a timing graph illustrating the periodicity of a 360 Hz ripple, a delay $\Delta t$ representing the time required to calculate Vdc after sensing Vdc, with reference to a moment Tr in the ripple cycle. The voltage prediction logic relies on the periodicity of the DC-bus voltage ripple to predict the DC-bus voltage (denoted by Vdc) for one switching cycle (t=1/fpwm=200 microseconds) ahead as Vdc(t+$\Delta t$)=Vdc(t−Tr+$\Delta t$). The delay $\Delta t$ corresponds to the switching frequency of the power module's power switches. In the present example the switching frequency is 2 KHz. The control logic causes a change in the motor voltage to compensate the space-vector PWM output of the VFD to generate an output voltage to the motor with less ripple. The compensation occurs at a frequency based on the switching cycle. In one example, the reduced ripple resulted in a total harmonic distortion (THD) reduction from 4.3% to 1.8% at a speed of 30 Hz and from 3.8% to 1.8% at a speed of 60 Hz. In one example, the change comprises a phase shift, which can be forward or backward in time based on the cyclic characteristic of the ripple, to correct for phase shifts in the overall system. A space-vector modulation (SVM) technique with time-varying DC voltage compensation is used by controller 102 to introduce the phase shift, as illustrated in FIGS. 5 and 6. In one variation, a voltage sensor measures a low pass filtered (LPF) DC-bus voltage, which is used as the "instantaneous" DC bus voltage, as the divisor for a reference/target output voltage. This divisor is multiplied in a SVM block 70 to generate a compensated reference on which the gate drive signals are based, e.g. IGBT switches comprised in the power module, whose output comprises the motor voltage. In other words, a value representing ripple as a proportion of Vdc, calculated on a switching-cycle basis and based on the corresponding value obtained during a prior phase-adjusted period, is multiplied by the speed reference to adjust the speed reference to negate the ripple.

2. Low Speed Stabilization

Figure 7:
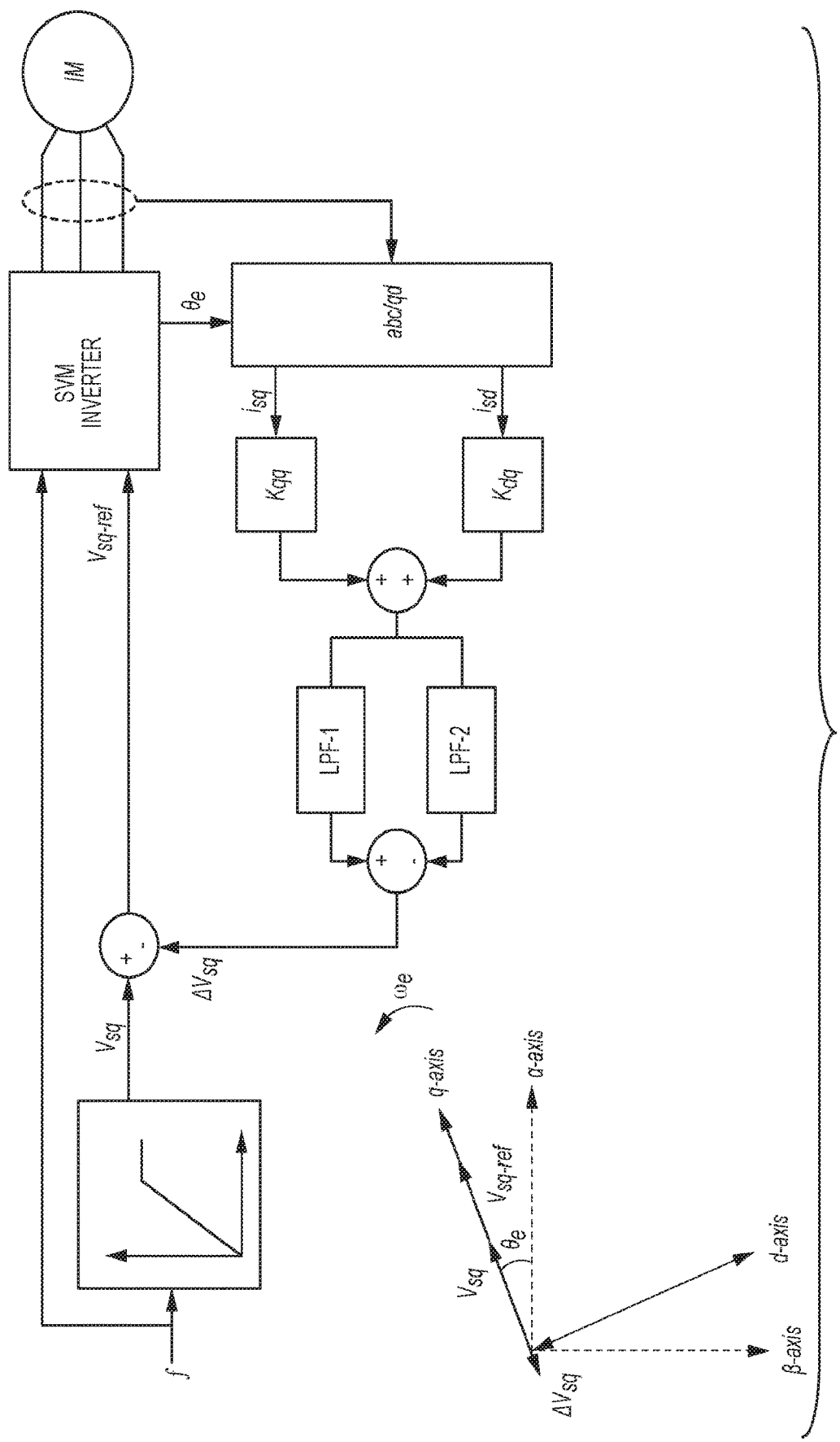
FIG. 7 is a block diagram provided to illustrate the functionality of stabilization logic in accordance with an embodiment of a motor drive configured to increase the stability of a motor electrically driven by the motor drive.
Figure 8B:
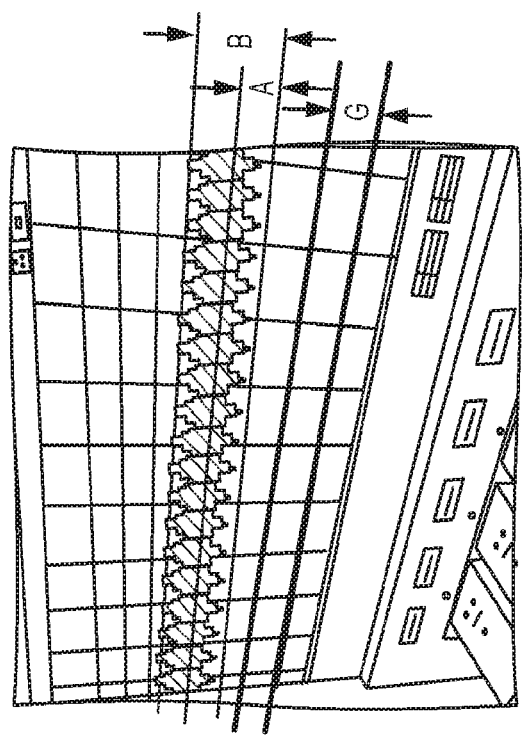
FIGS. 8A and 8B are screenshots provided to illustrate the effect of the stabilization logic described with reference to FIG. 7.
Figure 8A:
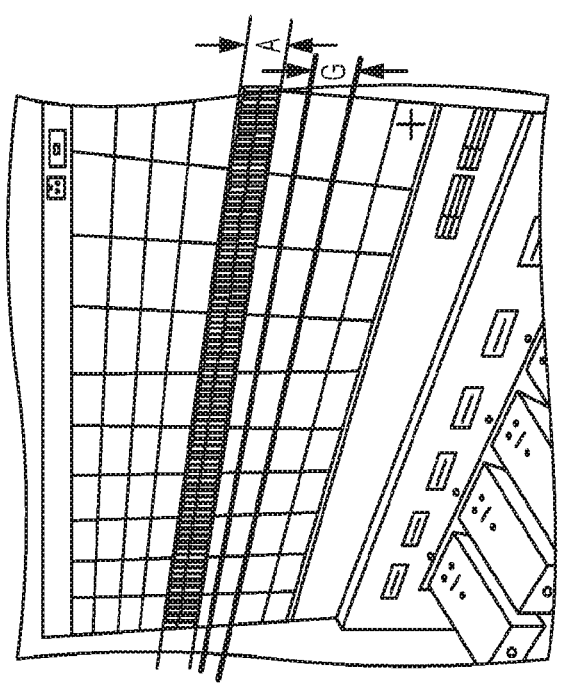

Induction motors, particularly large induction motors, can be unstable at low frequencies, e.g. below 40 Hz. Therefore current can be distorted, particularly in a small capacitance drive. The distortions can result in oscillations in the current that cause an overload fault. To prevent the fault, stabilization logic (the "stabilizer") was developed to implement a current stabilization method that dampens the oscillations. Generally, the stabilizer sums unfiltered q- and d-axis currents together, and then applies a low pass filter to the aggregate current. The filtered current signal is provided as feedback to the q-axis stator voltage. The method is particularly effective at dampening oscillations at low speed, low load conditions. The reference frame of the stabilizer is fixed to the q-axis voltage to force the d-axis voltage to zero to simplify the implementation; thus, the stabilizer only modulates the amplitude of the reference voltage. A block diagram of the stabilization logic is provided in FIG. 7. Photographs demonstrating the successful implementation of the stabilization method are provided in FIGS. 8A and 8B, where G represents a grid height, A represents peak-to-peak variation in the current after application of the stabilization method, and B represents variation in the current without stabilization. It can be seen that A is approximately 50% of B. Further, the envelope of the current in FIG. 8A lacks the spikes seen in FIG. 8B, denoting the reduction in oscillations and reduced variation, ergo increased stability.

3. Flying Start

Figure 9:
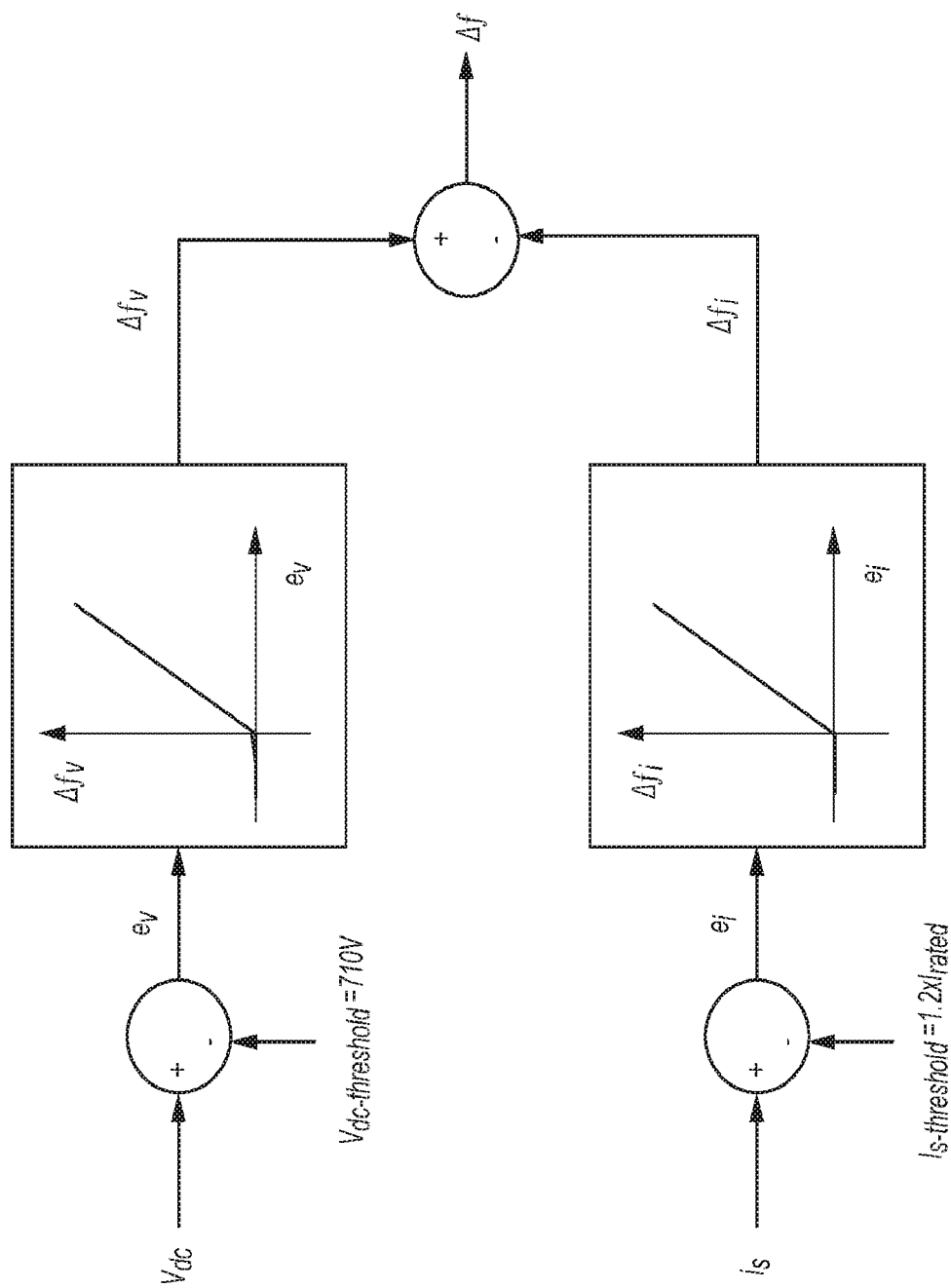
FIG. 9 is a block diagram provided to illustrate the functionality of speed control logic in accordance with an embodiment of a motor drive configured to start the motor drive in the event of a free-wheeling motor.

A motor may rotate even when the VFD is shut down. When the VFD starts, it may trip on a current overload if the rotation causes the VFD to regenerate. To prevent nuisance faults, the speed of the motor is estimated and additional information is used to generate control signals to mitigate the effect of error between the estimated and actual motor speeds. After completion of the motor speed estimate, the flying-start logic will start to generate motor voltages at the estimated frequency and ramp to the speed reference. Flying-start logic monitors the DC-bus voltage and the motor current, and dynamically adjusts the motor's voltage and frequency to provide a smooth and safe start-up by monitoring the voltage and current, and making adjustments if a voltage threshold or rated current are exceeded. A schematic diagram of the flying-start logic is provided in FIG. 9. In the example presented in FIG. 9, a voltage threshold equal to 710 volts is applied. If the voltage in the DC-bus exceeds the threshold, an increase in frequency is determined. Similarly, if the motor's current exceeds the rated current, a reduction in frequency is determined. The determined changes are summed to determine a frequency adjustment, which is applied to the speed reference. A change in the speed reference is accompanied by a change in the motor's voltage, generated in a traditional manner. In one example, an adjustment is made when current exceeds an adjustment threshold, e.g. 20% in excess of the rated current. In another example, an adjustment is made when current exceeds an adjustment threshold over a predetermined time.

Multiple Operating Modes

The VFD may be configured to satisfy different application requirements and modes of operation, which will be described with reference to FIGS. 10 to 14. A VFD may be configured with a mode of operation independently or concurrently with other of the described modes of operation.

1. Pipe Fill Mode

Figure 10:
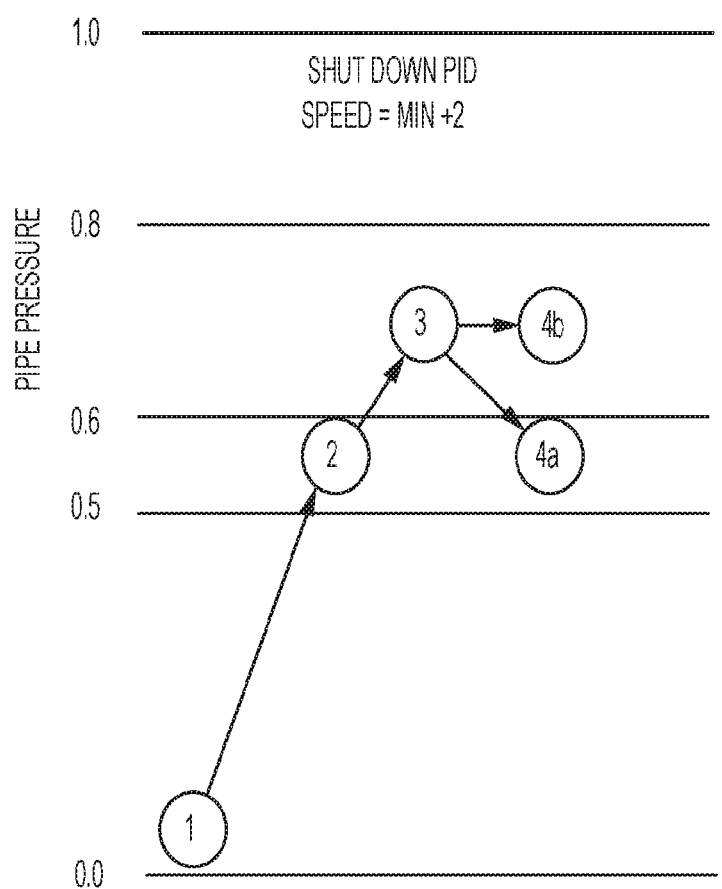
FIG. 10 is a timing diagram illustrating the functionality of start-up logic in accordance with an embodiment of a motor drive configured to start a motor drive in a liquid pumping system.

FIG. 10 is a graphical representation of pipe pressure and changes in motor speed generated in a pipe fill mode (PFM) of motor drive 100 for providing smooth system operation without hydraulic surges at start-up in a liquid pumping application. The PFM may be enabled or disabled. When disabled, the PFM will not be engaged. The PFM is engaged for a predetermined time, e.g. in a range from 1 to 60 minutes, at the end of which motor drive 100 enters a PID control operating mode. Additionally, the PFM has a PFM exit pressure (e.g. 25 PSI) corresponding to the pressure when the pipe is full, which when reached causes motor drive 100 to exit the PFM. In PFM, motor drive 100 controls speed by selecting an operating frequency based on pipe pressure. If the pipe pressure is below the PFM exit pressure, motor drive 100 increases the frequency in inverse proportion to the pipe pressure. In the figures, the pipe pressure is scaled to the PFM exit pressure, so that 1.0 represents PFM exit pressure and 0.5 represents 50% of the PFM exit pressure. Motor drive 100 has a minimum speed (frequency), referred to as the PID low frequency limit or Min frequency, and in the pipe fill mode the frequency is maintained above the PID low frequency limit, e.g. Min+2 Hz, to provide enough system pressure at the end of the PFM to switch to the PID control mode. Frequency changes are made over consecutive predetermined time periods, which may be of the same or different duration, depending on the pressure. An advantage of the PFM is that pressure is built in the system in a gradual manner to prevent increasing pressure too fast and potentially damaging equipment due to a mechanical (hydraulic) surge in the pipe. By filling the pipe and then engaging the PID control the potentially damaging surge is avoided.

At condition 1, e.g. at start-up, the pipe pressure is below the PFM exit pressure, thus the PID control is disabled or ignored. The VFD ramps up to the PID low frequency limit+2 Hz based on the VFD acceleration time. The pipe pressure is below 0.5, therefore the frequency is increased by 3 Hz in 9 seconds. If system pressure stays below 0.5, the frequency will be increased again by 3 Hz in 9 seconds. Then if the pipe pressure increases to condition 2, where the pipe pressure is between 0.5 and 0.6, no frequency adjustments are made. Thereafter pipe pressure increases to between 0.6 and 0.8 in condition 3, and the frequency is decreased by 1 Hz in 3 seconds. If system pressure returns to between 0.5 and 0.6 (condition 4a), no frequency changes will be made. However if system pressure stays between 0.6 and 0.8 (condition 4b), the frequency will be decreased again by 1 Hz in 3 seconds. Pressure rises again as the pipe fills, at which time the frequency is reduced again by 1 Hz until it reaches the PID low frequency limit+2 Hz. Thus frequency oscillates until the pipe fills and system pressure exceeds the PFM exit level, at which time the PFM ends and the VFD transitions to PID control. More generally, the PFM may be described as having a plurality of pressure zones, each zone having a corresponding frequency adjustment value and frequency adjustment duration, which in some embodiments decrease as the pressure approaches the exit pressure. At least one of such frequency adjustment values has a negative value, which is intended to slow down the motor as the pressure approaches the exit pressure. The number of zones may be selected based on a desired control resolution.

2. Variable Frequency High Level

Figure 11:
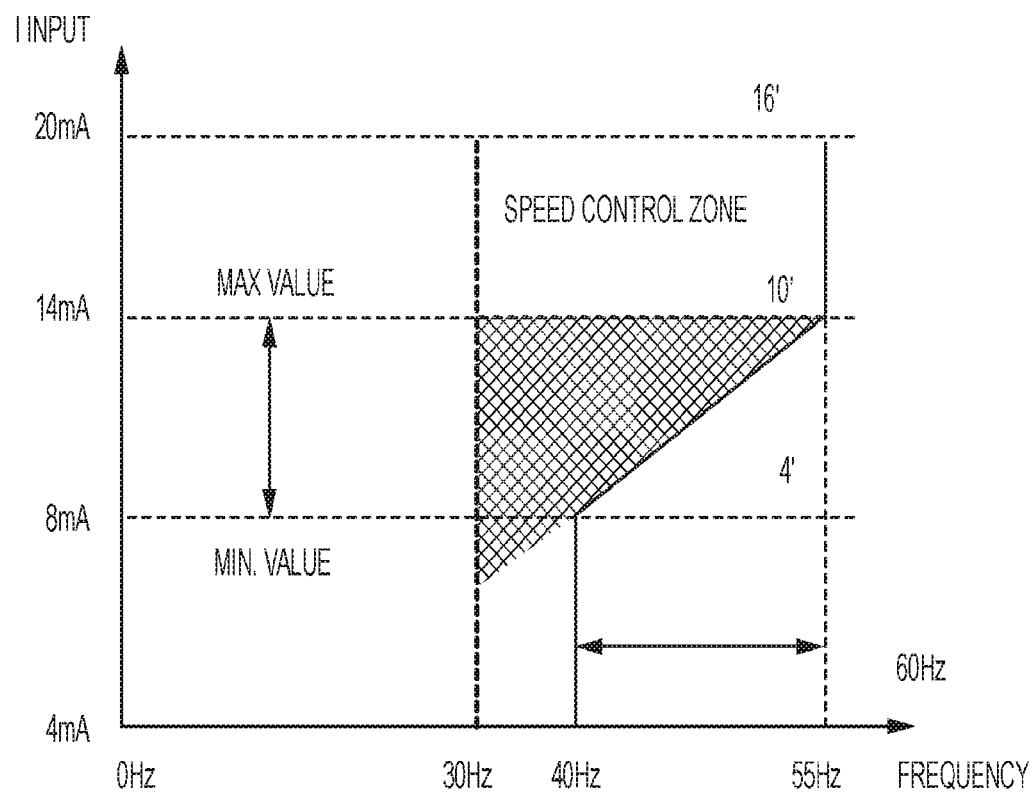
FIG. 11 is a graph provided to illustrate an embodiment of a motor drive operating in a variable high frequency limit mode.
Figure 12:
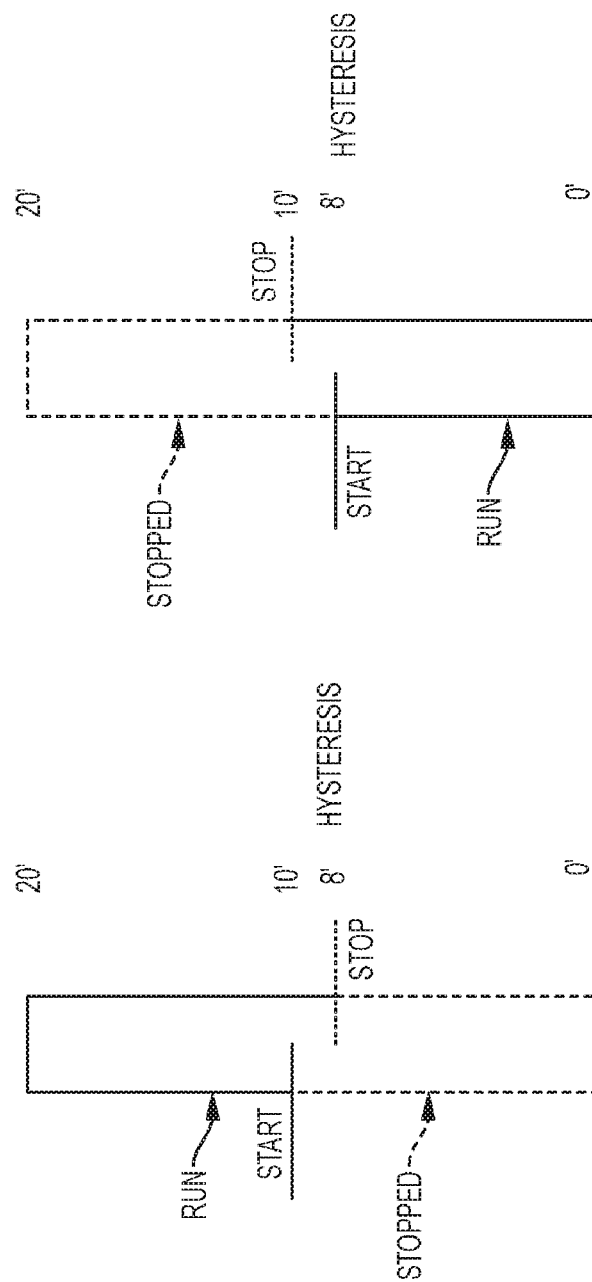
FIGS. 12A and 12B are graphs provided to illustrate an embodiment of a motor drive operating in an analog control mode.

In another embodiment, the VFD changes the speed range based on a depth parameter. In certain applications it is preferable to slow down the rate of fluid supply than to deplete the fluid. For example, in an irrigation application pumping will stop when the water level of a well or tank from which water is drawn reaches a minimum level. To prolong the pumping operation and avoid a dry well condition, the VFD controller will automatically reduce the frequency high limit to reduce the speed of the pump as the level of the well approaches the minimum level. FIG. 11 is a graphical representation of the speed range of the VFD relative to a water level signal in the range of 4-20 mA corresponding to a depth range of 0-16 feet. The VFD restricts a high frequency limit based on the water level signal. The motor is capable of operating from 0 to at least 60 Hz. Above 10 feet the minimum speed is set to 30 Hz, the high speed limit is set to 55 Hz, and the speed range is fixed, thus the VFD can regulate pressure by operating between 30 Hz and 55 Hz. Below 4 feet the minimum speed is set to 30 Hz and the high speed limit is set to 40 Hz, the speed range is fixed, thus the VFD can regulate pressure by operating between 30 Hz and 40 Hz. Between 4 and 10 feet the minimum speed is set to 30 Hz and the high speed limit is proportional to depth, between 40 Hz and 55 Hz, therefore the maximum speed attainable by the motor, and the speed range, are proportional to depth. As shown, the relationship between depth and the high speed limit comprises a straight line. In other embodiments the relationship may be curvilinear, quadratic, or may comprise any other relationship in which the high speed limit increases relative to depth without decreasing. Of course the high speed limit can be programed to be proportional to depth from the minimum depth upward and in various combinations depending on the reservoir from which the liquid is drawn and other variables.

3. Analog Control

In another embodiment, the VFD runs based on an analog signal corresponding to depth and may be scaled appropriately to fill or empty a tank or other defined space. FIG. 12A illustrates an application where a tank is emptied. The VFD starts running at or above 10 feet to empty the tank. When the depth of the water reaches 8 feet, the VFD stops running. The 2 foot difference is arbitrary and is provided as hysteresis to avoid repeated starting and stopping about the 10 feet value. FIG. 12B illustrates an application where a container is filled. The VFD starts running when the depth is at or below 8 feet. When the depth of the water reaches 10 feet, the VFD stops running. The start and stop depths, and the hysteresis, can be programmed in any manner known in the art. In one variation of the present embodiment, the speed of the VFD is linearly proportional to the depth, such that the VFD runs slower as it approaches the hysteresis range and faster as the distance from the hysteresis range to the actual depth increases.

The VFD is configurable with depth values, whether to fill or empty, and what type of analog input/output is desired. A switch (soft or hard) can be set to determine whether to fill or empty, and depth values can be entered via a graphical user interface to control when the VFD starts and stops running, including the amount of hysteresis. In one example, the input and output signals can be independently configured with a dual in-line package (DIP) switch to DC voltage (e.g. 0-10 VDC) or current (e.g. 4-20 mA).

4. Sleep Mode

The sleep mode provides another way to save energy and also increase reliability. In the sleep mode, the VFD "sleeps" under certain conditions and while sleeping does not convert DC power to AC power, thereby not generating power and heat in the power module of the VFD or heat in the motor, increasing reliability. The sleep mode is generally entered when the system is stable and at setpoint. Without this feature the VFD may cause the pump to run at a speed too slow to move water thus only wasting energy. Generally, once the VFD determines during a sleep monitoring time that the system is stable and at setpoint, the VFD enters the sleep mode. In the sleep mode the VFD continues to monitor pressure and exits the sleep mode once pressure falls below a wake-up pressure value.

The VFD starts monitoring for the opportunity to enter the sleep mode when the speed falls to near a "sleep mode detection threshold" or SMDT. The SMDT may be based on a frequency low limit (FLL) value indicative of no flow/demand and determined when the motor drive is operating without demand. In one example, the SMDT set to FLL-2 Hz. The VFD monitors for the opportunity to enter the sleep mode by running averaging loops (sleep monitoring time). In one example the sleep monitoring time is 10 seconds long with 1-second sample time for pressure and current.

Before entering the sleep mode the motor drive controller may perform a bump test to confirm a no or low flow condition before entering the sleep mode. In one variation, the controller bumps the pressure setpoint temporarily (a "bump") and then returns to the original setpoint and checks for a predetermined time if pressure is maintained. In one example the bump is 4% of the original setpoint. If the pressure reaches the new setpoint within 5 seconds and remains above the original setpoint +2% for a predetermined time, then the VFD enters the sleep mode. In another example the bump is 4% of the original setpoint. If the pressure does not reach the new setpoint within 5 seconds but the pressure is above the original setpoint +1% for a predetermined time, then the VFD enters the sleep mode.

In some embodiments, the bump test is only performed (and the sleep mode is only entered) once the pressure is within −1 Hz of the setpoint.

The predetermined time to check whether the pressure was maintained during the bump test may vary depending on the frequency of the VFD. In one variation, at a speed in the upper half of the speed range, the predetermined time may be 40 seconds, in the 25-50% of the range the predetermined time may be 25 seconds, and in the lower end of the range the sleep monitoring time may be 10 seconds. If the speed is between the low frequency limit and 0.5 Hz above the low frequency limit, the VFD will trigger the sleep mode condition (without bumping pressure) and if during sleep delay time pressure stays at set-point, VFD will go to sleep mode.

In another variation, the frequency is increased until a higher pressure (pressure boost) setpoint is achieved. When the system pressure reaches the boost value, the VFD changes the setpoint to the original value. If after the predetermined time (e.g. 6 seconds) the pressure is above the original pressure setpoint +1%, the VFD transitions to the sleep mode. Otherwise the VFD continues running in PID mode. However if the pressure is above the original pressure setpoint −1%, after a time delay it will repeat the pressure bump The sleep monitoring time may be determined experientially for each boost level and selected to respond with appropriate sensitivity to maximize the benefits of sleep mode without entering sleep mode prematurely or inappropriately.

Figure 13:
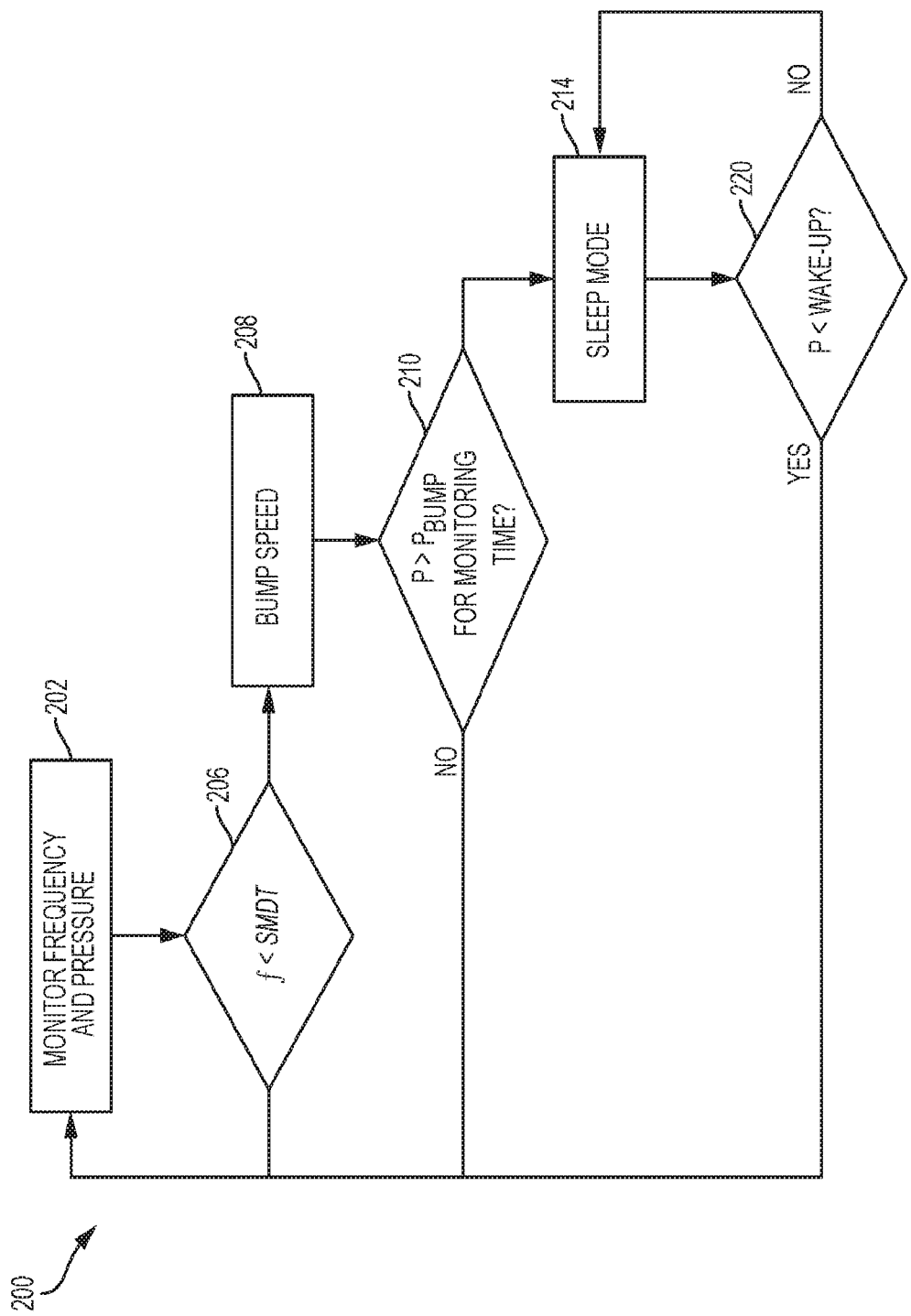
FIGS. 13 and 14 are, respectively, a flowchart and a timing diagram provided to illustrate an embodiment of a method of operating a motor drive in a sleep mode.
Figure 14:
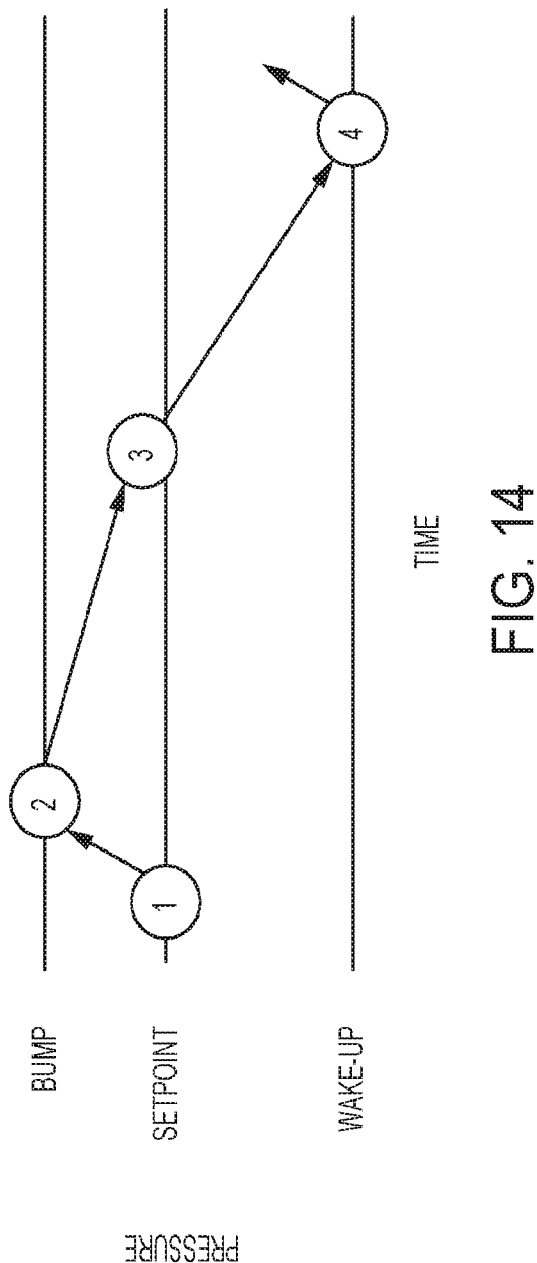

An embodiment of the sleep mode will now be described with reference to FIGS. 13 and 14. FIG. 13 is a flowchart illustrating an embodiment of a method 200 implemented by control logic of motor drive 100, described with reference to FIG. 4. FIG. 14 is a timing diagram to further illustrate the method described with reference to FIG. 13. The method begins at 202, by monitoring the frequency and pressure to detect the opportunity to enter the sleep mode. This is shown at condition 1 in FIG. 14. At 206 the VFD determines if the frequency fell below the sleep mode detection threshold. If not, the method continues at 202. If so, at 208 the VFD performs a speed bump to increase pressure and measures a pressure $S_{BUMP}$. The speed bump is shown as the transition from condition 1 to condition 2 in FIG. 14, indicating a frequency increase. Thereafter, at 210 the VFD determines if the pressure remained above the setpoint during the remainder of the sleep monitoring time. This is shown as the transition from condition 2 to condition 3 in FIG. 14. If so, at 214 the VFD enters the sleep mode. If not, the VFD continues to 202. In sleep mode, the VFD continues to monitor pressure, at 220, to determine when the pressure reaches a wake-up pressure, at 222 (transition from condition 3 to condition 4 in FIG. 14). If the pressure fell below the wake-up pressure, the VFD returns to normal operation at 202, and otherwise remains in sleep mode.

Another embodiment of the sleep mode will now be described. In the present embodiment the function of the sleep mode is based on zones indicative of the likelihood of entering the sleep mode. This mode of operation avoids various steps which are likely unnecessary thereby increasing the computational efficiency and operation of the motor drive. In one variation there are five zones corresponding to a sleep ready zone, a high sleep chance zone, a medium sleep chance zone, a low sleep chance zone and a no sleep zone. In other variations there may be more or fewer zones. In one example there are three zones, such as a low, medium and high sleep chance zones. The sleep mode based on zones may be independent of fixed frequencies defined to determine when to enter the sleep mode.

In some embodiments of the zone sleep mode, a frequency low limit (FLL) is determined when there is no demand. In one example the FLL is determined during initial startup by operating the pumping normally and then gradually decreasing demand (e.g. closing faucets) until there is no demand. The frequency of the motor drive minus 1 Hz may be set as the FLL. Of course the FLL may be set arbitrarily to the lowest frequency likely to turn the motor, e.g. 30 Hz. The frequency high limit (FHL) may be set as the highest frequency of the motor drive, e.g. 60 Hz or higher, depending on whether field weakening or other configurations are employed.

After setting the FLL and the FHL for the PID control of the VFD, the frequency control range is divided into zones, e.g. zones A, B, C, D, and E. Zone A is a sleep ready zone with a range between [FLL, FLL+0.5 Hz]. The motor drive enters the sleep mode quickly when the frequency of the motor drive reaches zone A. Zone B is a high sleep chance zone with a range between [FLL+0.5 Hz, FLL+(FHL−FLL)/4]. The motor drive enters the sleep mode less quickly when the frequency of the motor drive reaches zone B than when it enters zone A. Zone C is a medium sleep chance zone with a range between [FLL+(FHL−FLL)/4, FLL+(FHL−FLL)/2]. The motor drive enters the sleep mode less quickly when the frequency of the motor drive reaches zone C than when it enters zone B. Zone D is a low sleep chance zone with a range between [FLL+(FHL−FLL)/2, FHL−1.0 Hz]. The motor drive enters the sleep mode less quickly when the frequency of the motor drive reaches zone D than when it enters zone C. Zone E is a no sleep chance zone with a range between [FHL−1.0 Hz, FHL]. Of course ranges may be set arbitrarily or in any other predetermined manner. For example the ranges may be of equal size. In another example, the sizes of the ranges increase linearly from the FLL to the FHL. The ranges may be programmed in a table or calculated and stored in memory upon power-up.

When pressure is within a band around the setpoint (e.g. setpoint +/−1%), the VFD will periodically bump (increase) the pressure setpoint by a small amount, e.g. 4%, for a pressure bump time. After the pressure bump timer expires, the VFD will drop the setpoint to the original value and will check if the system pressure stays above the setpoint, e.g. +1 Hz or falls below. If the pressure is above the setpoint at the end of the pressure bump time, the VFD enters the sleep mode. The pressure bump has an adjustable sleep check time which varies depending on the frequency of the VFD and the zone. As the frequency that maintains the pressure about the pressure setpoint varies, the VFD performs fewer or more pressure bumps. As the frequency increases, the pressure bumps are performed less frequently because the VFD is operating at a speed that suggests that sleep is unlikely. As the frequency decreases, the pressure bumps are performed more frequently. In one variation the sleep check time is a multiple of the sleep check time for zone B. If in zone B the sleep check time is X seconds, in zone C the sleep check time may be X*2.5 seconds, and in zone D the sleep check time may be X*4 seconds. In zone E the VFD does not check and in zone A the VFD automatically enters the sleep mode. The sleep check times for zones B, C and D may be, for example, 10 seconds, 25 seconds, and 40 seconds.

Multiple Pump Systems

Figure 15A:
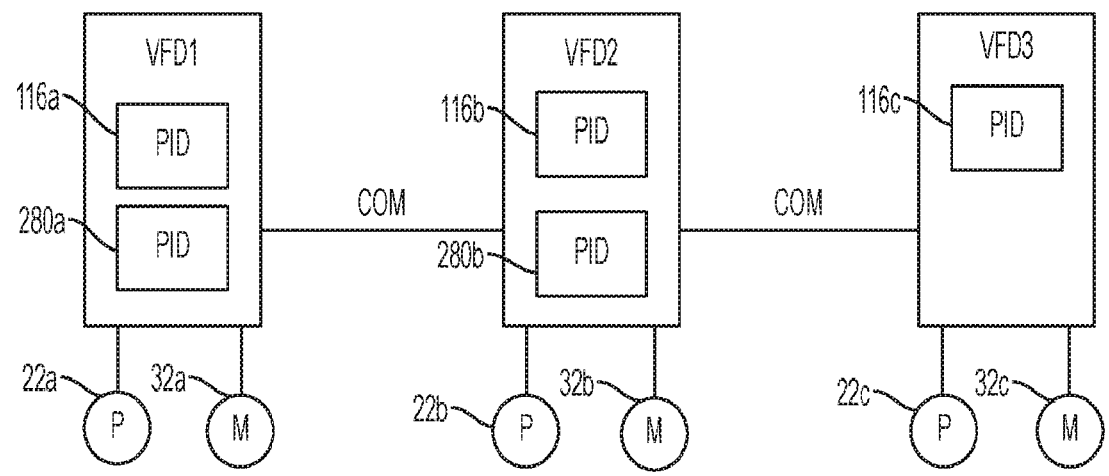
FIGS. 15A and 15B are block diagrams of embodiments of multi-pump systems.

In addition to various modes of operation described above, the VFD may also be configured to operate with other components to use multiple pumps in the same multi-pump system. FIG. 15A is a schematic diagram of a multi-pump system comprising three VFDs, VFD1, VFD2, and VFD3, each having a PID control, PID 116a, PID 116b, and PID 116c. The VFDs are electrically connected to three pressure transducers 22a, 22b, and 22c, and three electric motors, 32a, 32b, and 32c. Each of the motors is connected to drive a pump (not shown). The motors and pumps can be of equal or different sizes. Optionally, each VFD may comprise a second PID control, PID 280a and 280b, and each VFD may be communicatively coupled to another VFD by a communication (COM) line. The COM lines may transmit analog or digital signals. Example analog signals comprise 4-20 mA signals, 0-10 VDC signals, and AC voltage signals (e.g. 110 VAC). Example digital signals comprise wireless signals such as WiFi, serial communication signals such as RS-485, and discrete binary signals (ON/OFF). Unless otherwise specified, the term "PID control" control refers generally to any control including at least one of proportional, integral, and derivative gain components, but not necessarily all three. In variations of the present embodiment pressure transducers 22b and 22c are omitted and PID 280a, 280b provide speed references to the succeeding, or downstream, VFDs. Thus, VFD1 monitors pressure and may be referred to as the lead pump driver while VFD2 and VFD3 may be referred to as lag pump drivers. Of course the COM lines may also be used to provide pass-through speed references, without PID controls.

Figure 15B:
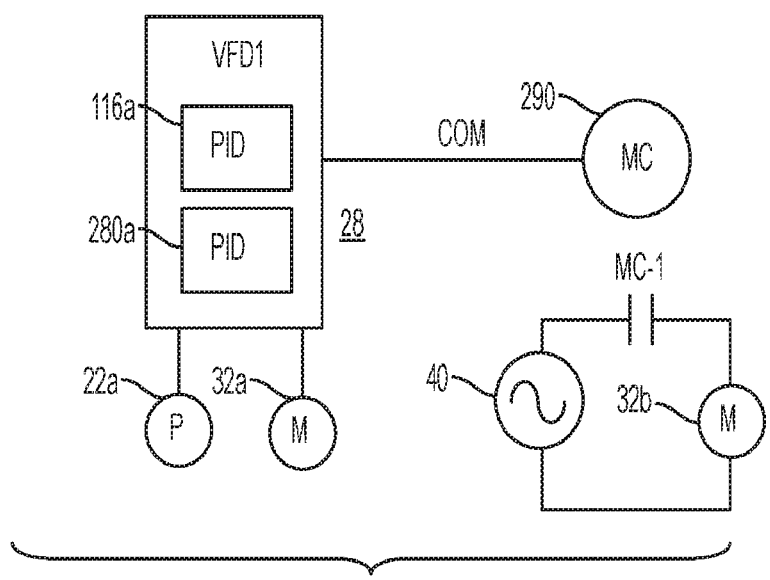

FIG. 15B is another schematic diagram of a multi-pump system comprising VFD1 communicatively coupled by the COM line to a main contactor 290. In the present embodiment VFD1 monitors pressure and may be referred to as the lead pump driver while main contactor (MC) 290 may be referred to as the lag pump driver. The COM line transmits an ON/OFF signal to engage MC 290. VFD1 may cause MC 290 to engage motor 32b by closing contact MC-1. In one example, control logic in VFD1 causes motor 32b to become engaged when demand is low and motor 32a to become engaged when demand is high, in addition or instead of motor 32b, both motors driving pumps fluidly coupled to the same water system. The lead pump driver in this case controls operation of the lag pump driver. In variations of the present embodiment the lag pump driver may comprise a contactor with soft-start or another VFD performing the lag role, with or without PID controlled speed reference.

1. Dual Demand Control

In various embodiments, the VFD includes dual demand control logic to operate in a dual demand control mode. The VFD may be comprised by any of the multi-pump systems described with reference to FIGS. 15A and 15B. In one embodiment, the VFD is communicatively coupled to receive high and low demand signals. High and low demand signals may be provided by high and low demand valves configured to permit flow in high demand situations and low demand situations. High and low demand signals may also be provided by transducers operatively coupled to detect when the high and low demand valves are open or from a control system configured to determine when high and low demand is required.

In one variation of the present embodiment, the VFD includes sleep mode control logic. If the VFD is in the sleep mode and receives the high demand signal, the VFD wakes up in the high demand mode. Otherwise it wakes up in the low demand mode. In the high demand mode the VFD will engage a high capacity pump and in the low demand mode the VFD will engage a low demand pump. Engagement of the high and low demand pumps may be performed utilizing the multi-pump systems described with reference to FIGS. 13 and 14. For example, the sleep control and dual demand logic may be comprised in VFD1, controlling pressure based on pressure transducer 22a, operating motors 32a and 32b, which are coupled, respectively, to high and low capacity pumps.

Figure 16A:
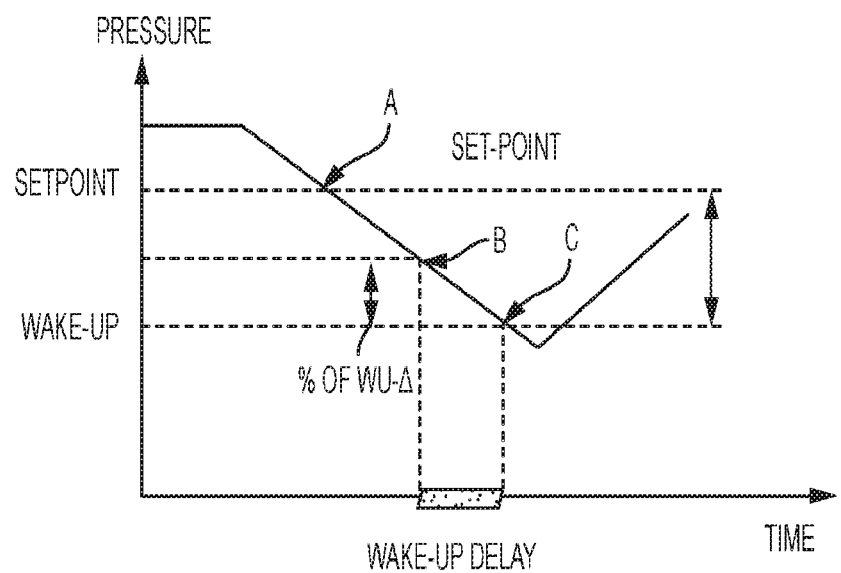
FIGS. 16A and 16B are timing diagrams provided to illustrate an embodiment of a method of operating a motor drive in a dual demand mode.
Figure 16B:
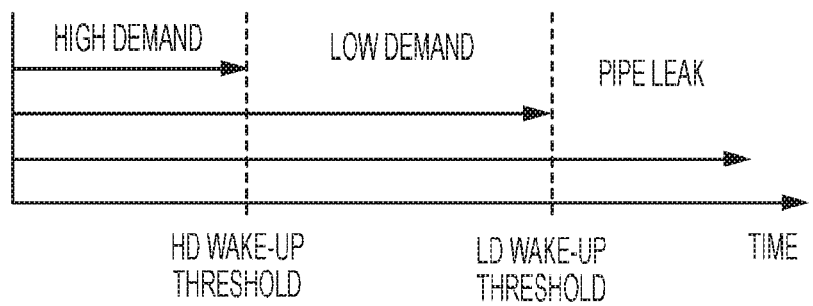

In another variation of the foregoing embodiment, the sleep control and dual demand logic are comprised in VFD, and the sleep mode control logic is configured with a "memory" feature depicted in FIGS. 16A and 16B. The control logic utilizes parameter related to the amount of time the VFD was in the sleep mode to reconfigure the VFD. FIG. 16A shows three points in time, A, B, and C. At point A the pressure has just fallen below the setpoint and the control logic begins monitoring pressure to detect when pressure reaches the wake-up threshold. At point C the pressure has reached the wake-up threshold and the control logic wakes up. Point B is an arbitrary programmable pressure value that can be configured as a percentage of the difference between the pressure setpoint and the wake-up threshold. This value may be in a range from 0-100%. In one example, the value is set to 50%. Upon the pressure reaching a value corresponding to point B, the control logic begins to track time and then determines the amount of time required to reach the wake-up threshold at point C. The time that transpires between points B and C may be referred to as the wake-up delay and can be measured with a timer, or a counter incremented at periodic intervals, or in any manner known in the art for measuring time.

When the VFD resumes operation after waking up, the VFD determines the wake-up delay and verifies or reprograms the PID control to operate with high or low demand configuration. The VFD is programmed with high and low demand (HD and LD respectively) wake-up thresholds and includes demand determination control logic configured to compare the last wake-up delay to the thresholds and determine, based on the difference, whether to wake-up in high or low demand mode. Referring to FIG. 16, the demand determination control logic compares the wake-up delay to the high demand wake-up threshold. If the high demand wake-up threshold equals or exceeds the wake-up delay, the VFD will wake up in high demand mode. If the wake-up delay exceeds the high demand wake-up threshold but is equal or shorter than the low demand wake-up threshold, the VFD will wake up in low demand mode. If the wake-up delay exceeds the low demand wake-up threshold, the VFD will determine that there is a leak and will shut down. The high and low demand wake-up thresholds are programmable. In one example, the VFD activates a protection feature if the wake-up delay exceeds a low demand wake-up threshold. Example protection features include a pipe leak alarm, shut down of the VFD, and transmission of a fault signal.

This feature finds utility in systems which may comprise a pump sized to satisfy a main (high) demand but also required to pressurize a low demand pipe system, which can be damaged if the pump is operated at the main demand. For example, a pump sized for a high demand system (e.g., a pivot) may also supply water to a low demand line (e.g., sprinklers).

In a variation of the present embodiment, the VFD includes programmable features to avoid over-pressurizing the system. In one example, the VFD includes a low demand pressure setpoint. The low demand pressure setpoint is configured to generate lower pressure, particularly immediately after the VFD starts up, which is when the system exhibits the largest pressure difference between its actual pressure and the "normal" pressure setpoint. This lower setpoint is chosen by the VFD upon determining that it will wake-up in the low demand mode. If the VFD wakes up in the high demand mode, the VFD will choose the normal pressure setpoint. In another example, the VFD includes a low demand high speed limit. The low demand high speed limit is an adjustable setting that may be adjusted to maintain pressure at a low demand pressure setpoint while setting a frequency limit that is lower than the frequency limit set for the high demand mode.

In a further variation of the present embodiment, the VFD includes a low demand timeout timer to ensure sufficient water supply when the VFD wakes up in the low demand mode. In the present variation, the low demand timeout timer starts when the VFD wakes up in the low demand mode. If the pressure does not reach the pressure setpoint in a predetermined amount of time, the VFD switches to the high demand mode. If the VFD trips due to overpressure, the VFD restarts in the low demand mode.

2. Repeater Mode

The VFD may be configured with repeater logic configured to repeat (or follow) an analog input signal, wherein the output signal corresponds to the input signal. If the input signal is a pressure signal, the output signal is an appropriately scaled pressure signal which may be communicatively coupled to other VFDs, controllers or supervisory control and data acquisition (SCADA) systems by the COM line shown in FIGS. 15A and 15B. Exemplary controllers include programmable logic controllers. A system of pump drivers comprising repeater logic enables each pump driver to operate independently and, except for one of the pump drivers, to operate from a common pressure transducer. Of course additional pressure transducers may be provided, coupled to the same VFD or to different pump drivers, to provide redundancy and increase reliability. In some embodiments, the output signal corresponds to the frequency of the lead VFD and is an analog signal. Accordingly, communications modules are not necessary, simplifying the VFD's construction and reducing its cost. The analog signal may also simplify the requirements of the lag VFDs, which may simply be configured to run at a frequency corresponding to the analog signal.

3. Duplex Pump Configuration

In another embodiment a lag pump driver is provided and a lead pump driver is programmed to control the lag pump driver to supplement its capacity. In a high demand condition, when the lead pump driver cannot maintain pressure at full speed, it causes engagement of the lag pump driver and maintains the engagement until demand is reduced. As demand decreases the lead pump driver reduces its speed to maintain pressure. When the speed reference reaches a lag stop speed while the system pressure is at the setpoint, the lead pump driver disengages the lag pump driver.

In one variation of the present embodiment, the lead and lag pumps have different capacities. The lag stop speed may be a speed which corresponds to the capacity difference of the lead pump operating at high and lag stop speeds, and may be set such that said capacity exceeds the capacity of the lag pump, so that when the lag pump is disengaged the lead pump can make up the loss of capacity. Accordingly, the lead pump has higher capacity than the lag pump. The high speed may be defined by the high frequency limit as described before. The duplex pump configuration may comprise one pressure transducer providing a signal which the lead pump driver may use to control, or more than one pressure transducer, in which configuration each pump may control its speed. In one example, the lead pump driver comprises repeater mode logic and controls the speed of the lag pump driver to provide smoother transitions between one and two pump operation.

In some embodiments, a low capacity, or jockey, pump, operates with a high capacity main pump in a fire control system. The jockey pump pressurizes the fire control system under normal conditions. If demand increases, for example if a sprinkler begins discharging water, the main pump runs and the jockey pump stops. Of course the jockey pump could also run to supplement capacity. The VFD may control a jockey pump starter via a relay output at a preset pressure, for example as shown in FIG. 15B. When the pressure reaches the preset pressure, the jockey pump is engaged and the main pump is disengaged. Below the present pressure the main pump is engaged.

4. Alternating Function

In some embodiments the roles of the lead and lag pumps may be reversed. The pumps may have similar capacities. The lag stop speed may be configured as a speed sufficient to quickly increase flow while the lag pump comes up to speed when engaged. This configuration provides an alternation function and pump redundancy. The lead and lag roles may be reversed, for example, after the lead pump runs a predetermined number of hours.

In a variation of the present embodiment, multiple lag pumps are provided. In one example, if the speed of the lead pump driver exceeds a first threshold and the pressure is less than setpoint by a second threshold for a predetermined time period, then the lead pump driver engages the first lag pump driver to supplement capacity. The second threshold may be 2% of setpoint. After a predetermined time, if the conditions remain, then the lead pump driver engages the second lag pump driver to supplement capacity even more. In this manner the lead pump driver can engage a plurality of lag pump drivers to bring on capacity as required to maintain the setpoint pressure of the system.

A similar scheme is employed to stop the lag pumps. If the speed of the lead pump driver falls below a third threshold and the pressure is at or above the pressure setpoint for a predetermined time period, then the lead pump driver disengages the lag pump driver last engaged, to decrease capacity. After a predetermined time, if the conditions remain, then the lead pump driver disengages the next in time lag pump driver to decrease capacity even more.

In one embodiment, the pumps in the system are assigned identification numbers. The lead pump is assigned number 1. If more pumps are available than needed, those pumps can be assigned stand-by roles and may be brought online to substitute for another pump in case of failure or excessive use, to increase reliability. Lag pumps can be configured to run using a pressure transducer coupled thereto, or to follow a speed reference from another pump driver, or to operate at a preset speed, e.g. the line frequency.

In one example, the lead pump driver is programmed to lead for a predetermined time, referred to as the "alternation" time. When the predetermined time expires, the lead pump driver signals the first lag pump driver in the sequence to take on the lead role, which the first lag pump driver confirms, and then switches to lag mode. A short time after sending the confirmation signal, the first lag pump driver switches to lead mode. It then checks to confirm communications with all the lag pump drivers. If the first lag pump driver fails to respond, the next in line pump driver is assigned the first lag position.

5. Dual PID Control

Figure 17:
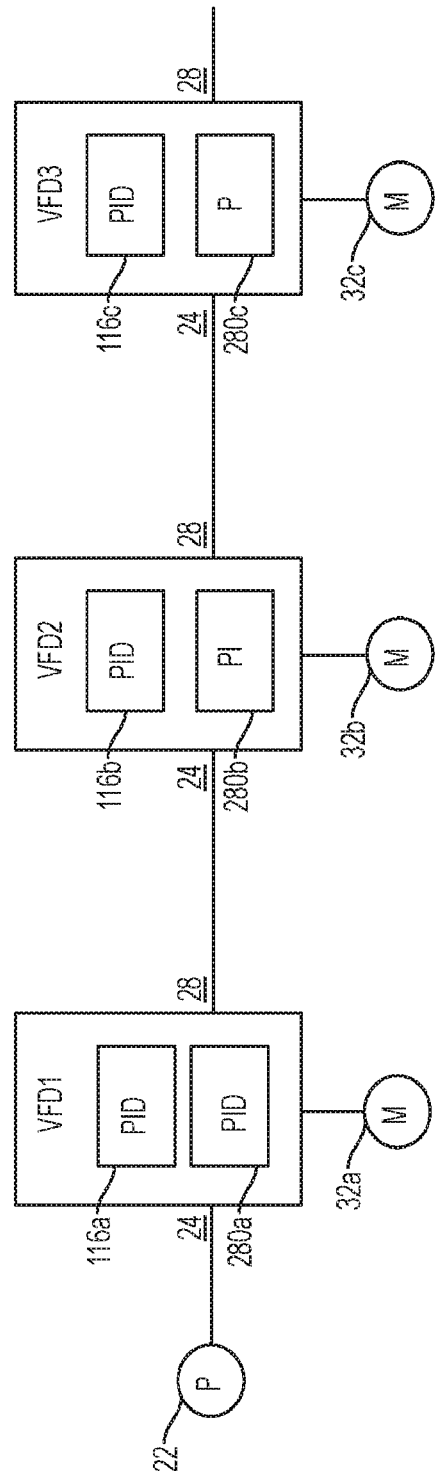
FIG. 17 is a block diagram of another embodiment of a multi-pump system.
Figure 18:
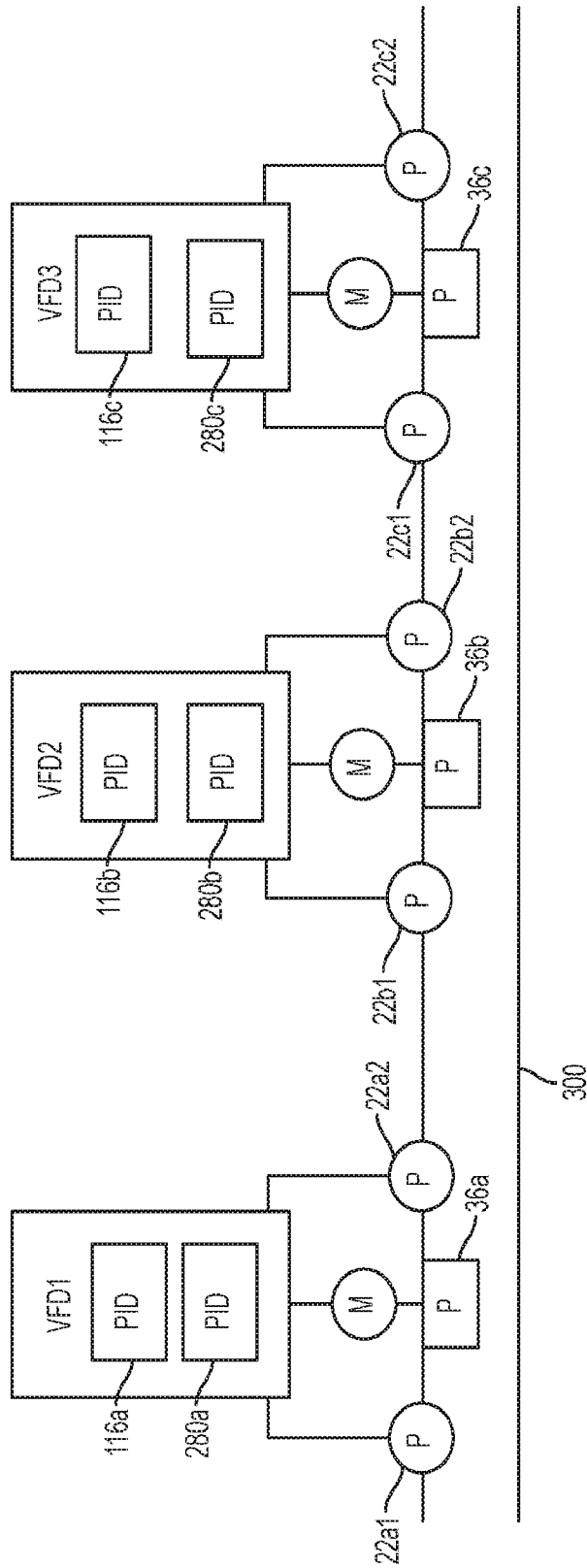
FIG. 18 is a block diagram of another embodiment of a multi-pump system.

Referring to FIG. 17, in some embodiments a second PID control is provided to enhance functionality. In one variation of the present embodiment, PID 116a controls the speed of the pump while PID 280a generates a speed reference to a lag pump driver via output 28. In another variation of the present embodiment, PID 280a generates a high frequency limit for the VFD based on another input received by the VFD. For example, the second input may be a depth signal as discussed before with reference with FIG. 11, in which case the depth signal limits the speed of the pump in proportion to the depth.

In another variation of the present embodiment, dual PID control is provided in a booster pump application to maintain pressure in a pipe 300. As shown in FIG. 17, each VFD is coupled to two pressure transducers to obtain inlet and outlet pressures, or upstream and downstream pressures related to the pump driven by the VFD. VFD1 receives inputs from pressure transducers 22a1 and 22a2 to control pump 36a, VFD2 receives inputs from pressure transducers 22b1 and 22b2 to control pump 36b, and VFD3 receives inputs from pressure transducers 22c1 and 22c2 to control pump 36c. Each VFD maintains a discharge pressure setpoint with the first PID control and limits the speed of the pump with the second PID control based on a suction (or upstream) pressure. When the suction pressure drops below a speed limiting level, the speed of the pump is limited to cause the pump to run slower but for a longer time period, even if not maintaining the pressure setpoint. If the suction pressure drops further, below a stop level, the VFD stops operation of the pump, to protect the pump in a low supply situation, e.g. low water level in a well. The VFDs may operate without any direct communication between them. A three-stage boost system may be employed to raise the upstream pressure of the system having 30 PSI of upstream pressure by 50 PSI, for example. More or less booster pumps may be provided based on the boundaries of the upstream pressure, the requirements for the downstream pressure, and the pump size, type, and configuration.

Safety and Maintenance Features

1. Damper Output

In HVAC applications it may be necessary to open a damper before engaging the motor. In some embodiments, the VFD includes a power output for a solenoid coupled to the tamper and supplies power through the power output to open the damper. This feature simplifies the overall installation of the system by eliminating the need to supply a separate power source for the solenoid.

2. Pre-Lube

In some embodiments, the VFD activates a lubrication pump before engaging the main pump. The lubrication pump causes a lubricating fluid to flow through a hollow shaft of the main pump to lubricate bearings and other components. After a predetermined lubrication time, the lubrication pump is disengaged and the main pump is started by the VFD.

3. Temperature Control

In one embodiment, the VFD changes operating parameters responsive to a temperature exceeding a high temperature threshold, to maintain the temperature of the VFD or the power module temperature below the high temperature threshold. In one variation of the present embodiment, the VFD reduces the speed of the motor to reduce current flow, thereby reducing the amount of heat added to the VFD. In one example, the VFD controller reduces the maximum frequency limit to reduce the speed. In another variation, the VFD drops a carrier frequency setting in addition to gradually reducing the speed of the motor. The carrier frequency is the switching frequency of the power switches in the inverter. Reducing the carrier frequency reduces heat in the power module. The carrier frequency may be reduced, for example, from above 10 KHz to 2 KHz. If the temperature remains above a predetermined shut-off temperature for a predetermined time, the VFD will shut down.

4. Transducer Redundancy

In one embodiment, the VFD is coupled to two transducers. One transducer provides a feedback signal to the VFD and is referred to as the operating transducer. If the operating transducer fails the VFD switches to the second, or stand-by, transducer and continues operating. If only one transducer is installed and it fails, the VFD would shut down. The VFD may detect that the operating transducer failed if the transducer signal exceeds minimum or maximum levels for a predetermined time, or if the transducer signal is lost. In one example the stand-by transducer has a pressure capacity greater than about 200% of the pressure capacity of the operating transducer. The greater pressure limit ensures that the bypass transducer can withstand a pressure surge that may damage the operating transducer.

5. Dry Well Detection

In one embodiment, the VFD detects that there is insufficient water available for pumping by monitoring the motor current and frequency. If the frequency is high and the current is low for a predetermined time, the VFD will shut down to protect the pump seals and other components of the pump that may fail if the pump runs dry. In a variation of the present embodiment, the VFD will wait a well fill time and then restart. If the VFD detects a dry well again within a given time, it will again shut down and will restart after doubling the well fill time, giving the well more time to replenish. The given time may be 60 seconds. The process continues, doubling the well fill time each time, until the well fill time matches the replenishment rate of the well. In one example, after demand is discontinued and the VFD stops, the well fill time is reset and the process repeats. In another example, when the VFD finally runs without tripping for three minutes, the well fill time is saved and becomes the time used in subsequent cycles of the VFD. In one variation, a well fill time is saved which is less than the well fill time that was saved but more than the well fill time used to reset, to ensure that the well fill time is repeatedly tested in order to avoid unnecessarily waiting too long while not repeatedly testing from the shortest amount of time.

Graphical User Interface

The smart device may comprise an application to provide a graphical user interface (GUI) that works in conjunction with the motor drive to enhance the value of the pumping system. The GUI provides images and software buttons which the user activates to navigate between pages and features. As used herein a "software button" is a combination of a software object and an image which indicate to a user where to touch a screen of the smart device to activate the software object, mimicking the function of a hardware button in software. The software object includes processing instructions executable when the screen is touched over the image. The software object may comprise the image and is provided by the GUI, which may provide other images and objects, which in combination may be referred to as a GUI page or simply a page. The application may comprise a plurality of modules comprising software objects, described below.

1. Startup and Commissioning Report

Figures 19A, 19B, 19C:
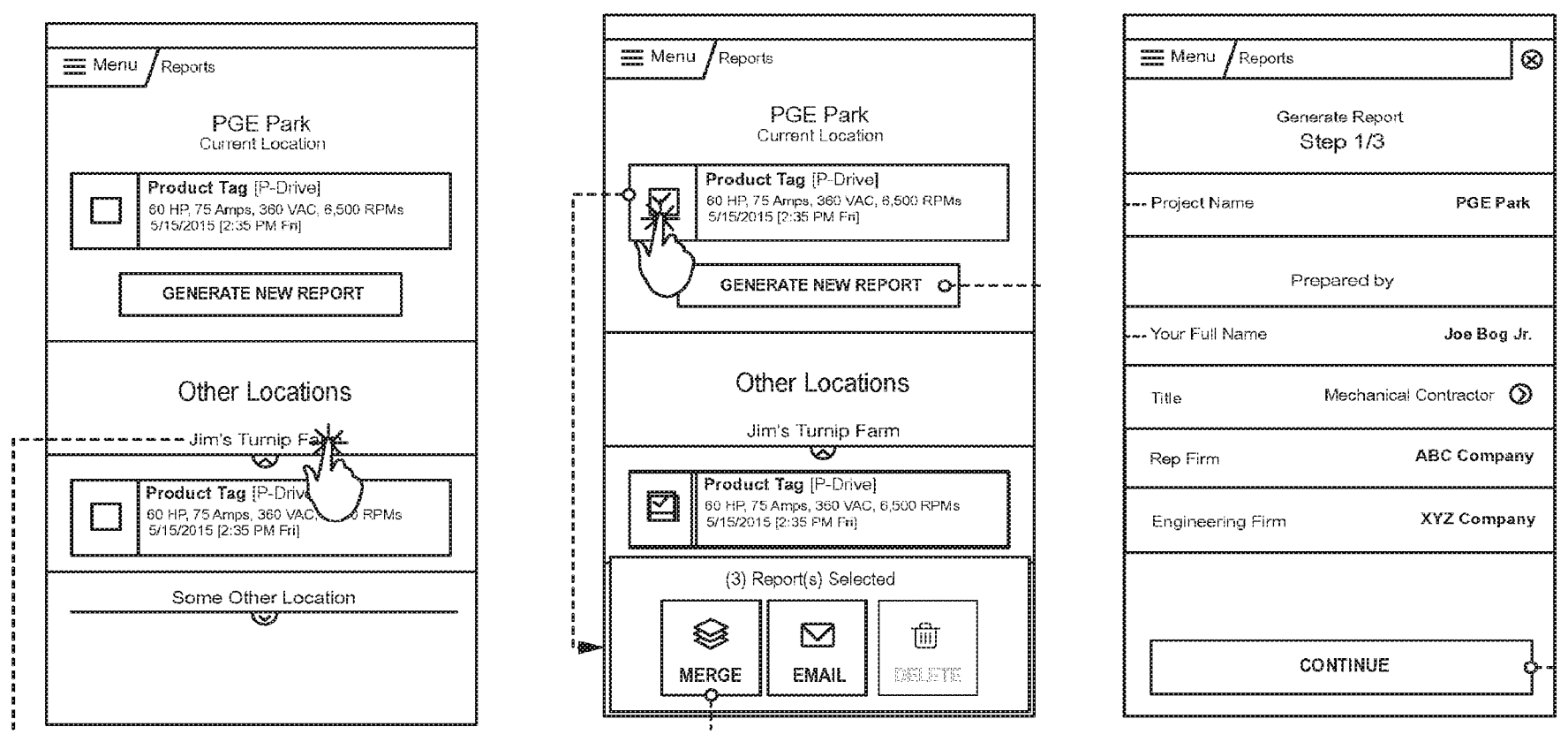

A reporting module allows a user to add content to, and generate, a startup and commissioning report that displays all running values and parameter settings of the motor drive at the time the report is initiated. The startup and commissioning report provides evidence of the performance of the motor upon commissioning based on the setup parameters entered by the installer. The report may provide evidence of the proper functioning of the pumping system when installed which may be useful for assigning liability in case the pumping system fails or malfunctions at a later time. FIG. 19A is a screenshot illustrating a display of the current location and a software button which a user can activate to generate a new report. A lower portion of the screenshot shows a list of other locations which a user can select to produce a combined report merging the data from all the selected location.

FIG. 19B is a screenshot illustrating a user's selection of the current location and a popup window providing an option to merge reports, which appears only if another report exits. The GUI presents texts in the popup window showing that 3 reports have been selected, which the user can merge or email.

Figures 20A, 20B, 20C:

FIG. 19C is a screenshot illustrating the first of three steps to generate the report. In the first step the user enters information to generate the report, including a project name, and the preparer's full name, title, representative firm, and engineering firm. Upon activating a "continue" button the GUI proceeds to step 2, shown in FIG. 20A, where the user can enter notes and is prompted to attach a photo of the pumping system. As shown in FIG. 20B, the user may also select an existing photo to attach. After attaching a photo the user signs the report in step 3, as shown in FIG. 20C and provides consent by activating a checkbox. The user should ensure that the motor is running in a stable manner before activating a "generate report" software button to continue. Upon activating the software button the GUI captures a set of data representative of the operation of the motor at the time of activation.

Figure 21:
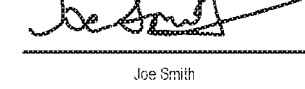
FIG. 21 is a screenshot of a start-up report generated with the mobile application reporting module of FIGS. 19A-19C and 20A-20C displaying values and settings of a motor drive obtained at the time the report was initiated.

FIG. 21 illustrates a representative report including the installer's information, photo(s), signature, and the set of representative data including the running values and settings captured when the report was initiated. The representative data evidences the configuration and performance of the motor at the time the installer turns over responsibility to the user.

2. Startup Wizards

Figures 22A, 22B, 22C:
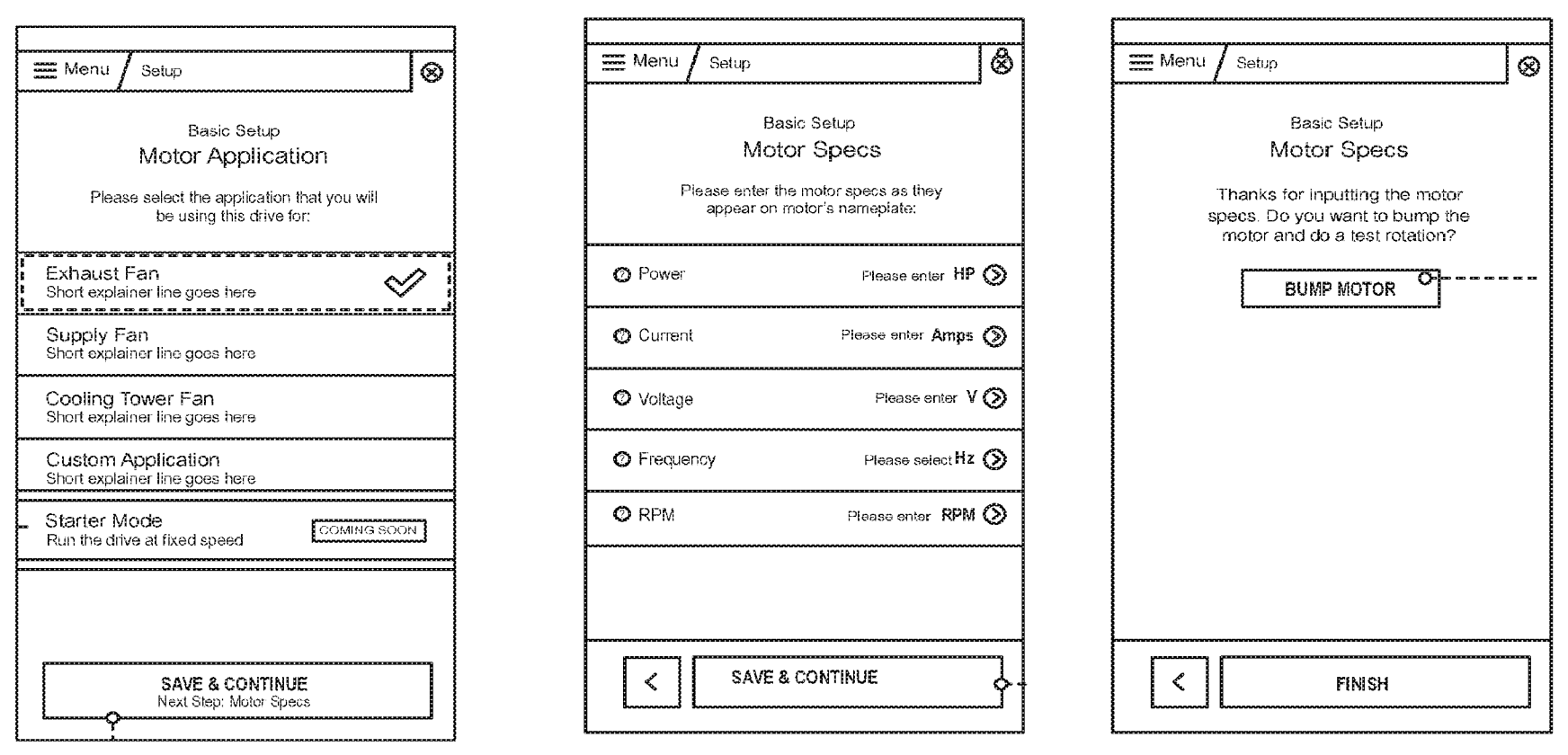
Figure 23A:
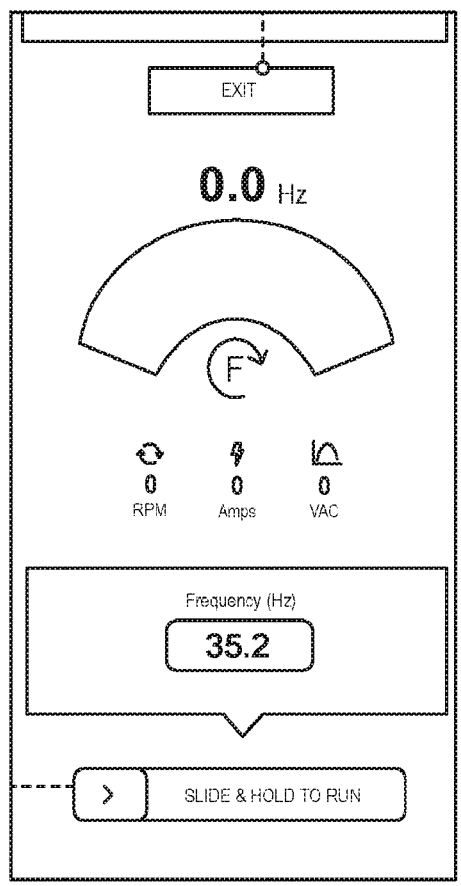
Figure 23B:
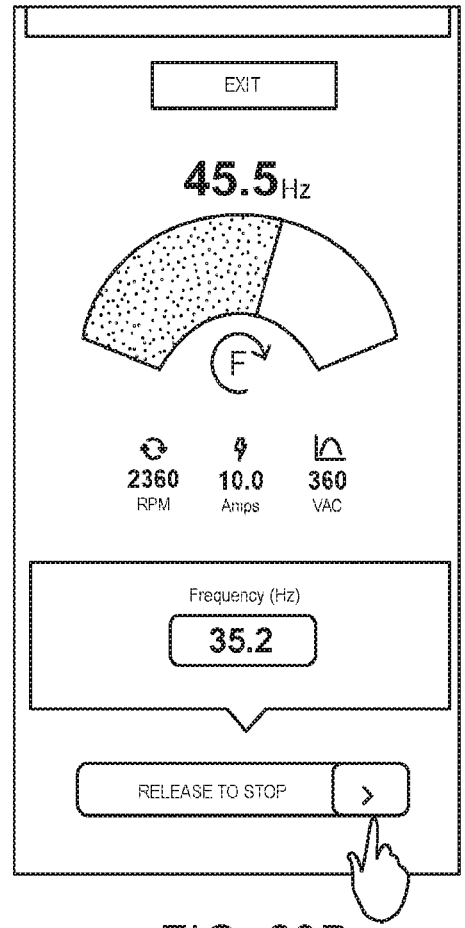

An intuitively structured wizard helps users navigate through the various parameters of the motor drive that need to be programmed prior to starting up the motor drive and the motor. Items to be programed include a motor application, horsepower, full load amps, voltage, frequency and RPM of the motor. In addition, the wizard enables the user to select how the motor is started, stopped, monitored and protected. FIG. 22A is a screenshot providing various application options, and showing the selection of an "exhaust fan" application. Other applications include supply fan, cooling tower, etc. Selection of the application configures the motor drive to the selected application. Application dependent variables include motor RPM, acceleration and deceleration times, frequency low limit and stop mode, motor current (full load amps or service factor amps), PID feedback type (standard or inverterd), PID reference sources (keypad, analog input, Modbus, BACnet communications, damper actuator output, etc. As shown in FIG. 22B, thereafter the user selects motor specifications, including power, current, voltage, frequency and RPM. These parameters define the characteristics of the motor. The application combines the motor specifications with the application selection to determine various operating parameters for modes of operation (described above) associated with the application. Once the motor drive is configured as described, the user can "bump" the motor by activating a corresponding button as shown in FIG. 22C. If the user chooses to bump the motor, the application provides a frequency field where the user can enter a selected speed. The user then slides and holds a bar and the application engages the motor while the user holds the bar, as illustrated in FIG. 23A. FIG. 23B shows that while bumping the motor to a desired speed of 35.2 Hz the motor actually rotated in a forward direction at 2360 RPM while drawing 10 amps of current and drawing 360 PSI of vacuum. The user releases the bar to stop the motor. Motor RPM is calculated as output frequency/line frequency*rated RPM. Rated RPM and line frequency may be input by the user based on location and the nameplate of the motor.

In a similar manner the startup wizard enables the user to select other operating parameters of the application and motor including, for example, whether to control speed based on a kepypad entry, an analog signal received via an I/O interface, a PID speed reference resulting from a comparison of a process variable and a corresponding setpoint, e.g. pressure, flow and temperature, the characteristics, units, loss action and loss delay of a feedback signal, PID parameters, etc.

3. Bluetooth Firmware Update from App

Figures 24A, 24B, 24C:
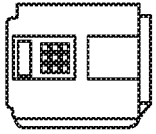
FIGS. 24A-24C are screenshots of a graphical user interface of a mobile application warranty and update module structured to register a motor drive and update its firmware.

The application has pump identification information. The warranty and update module includes a GUI update page where the identification information and software version of the motor drive are displayed. The update page provides upgrade and registration buttons, shown in FIG. 24A, which when activated by the user generate additional pages, shown in FIGS. 24B and 24C, where the user can upgrade the software and register the motor drive. Referring to FIG. 24A, a screenshot that exceeds the length of the screen indicates that the page must be scrolled to review all the information therein. Referring to FIG. 24B, the user can select one of many upgrade versions by selecting a corresponding upgrade button. Upon activation the application initializes a software download from the web service to the mobile device and then the mobile device transfers the software to the motor drive, where it is installed over the current version. FIG. 24C is a screenshot showing inputs the user provides to initiate registration of the motor drive.

4. Troubleshooting Guide

Figure 25C:
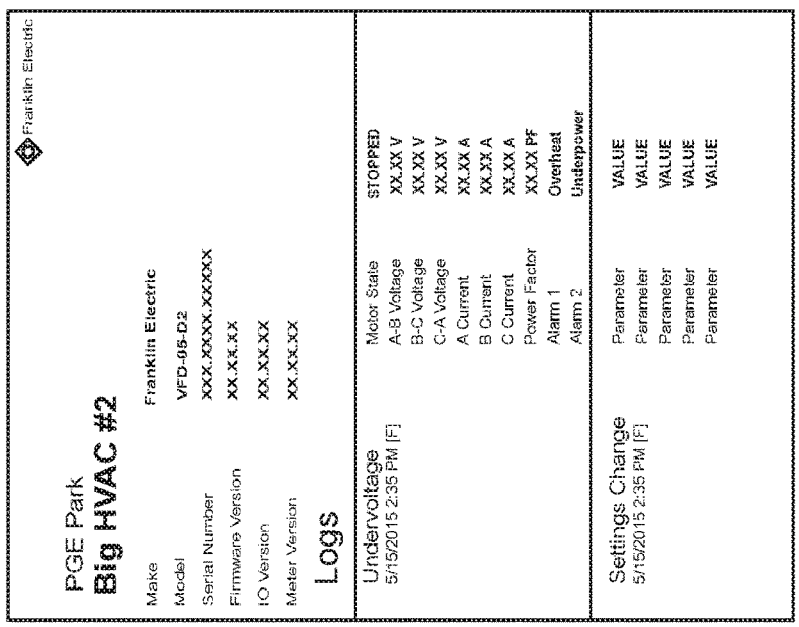
FIGS. 25A-25C, 26A and 26B are screenshots of a graphical user interface of a mobile application log module structured to selectively present fault events experienced by the motor drive or the motor.
Figure 25B:
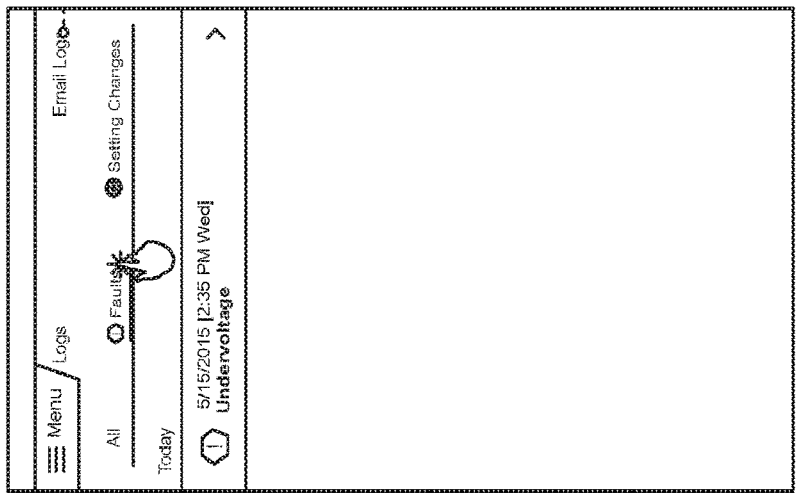
Figure 25A:
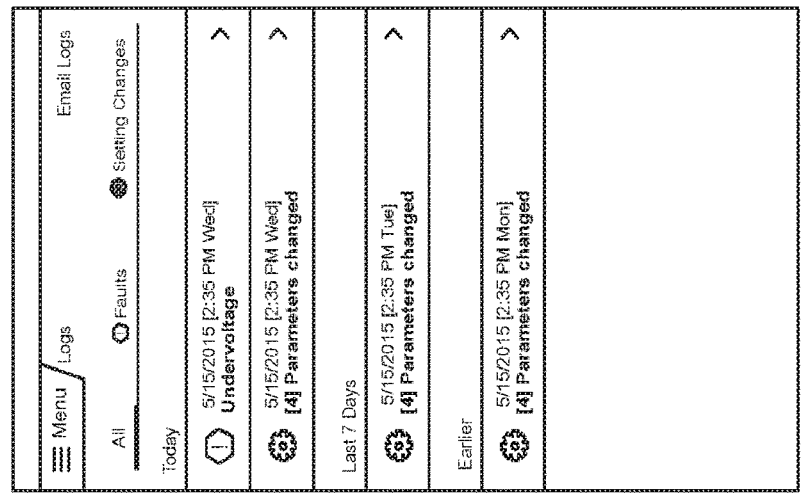
Figure 26A:
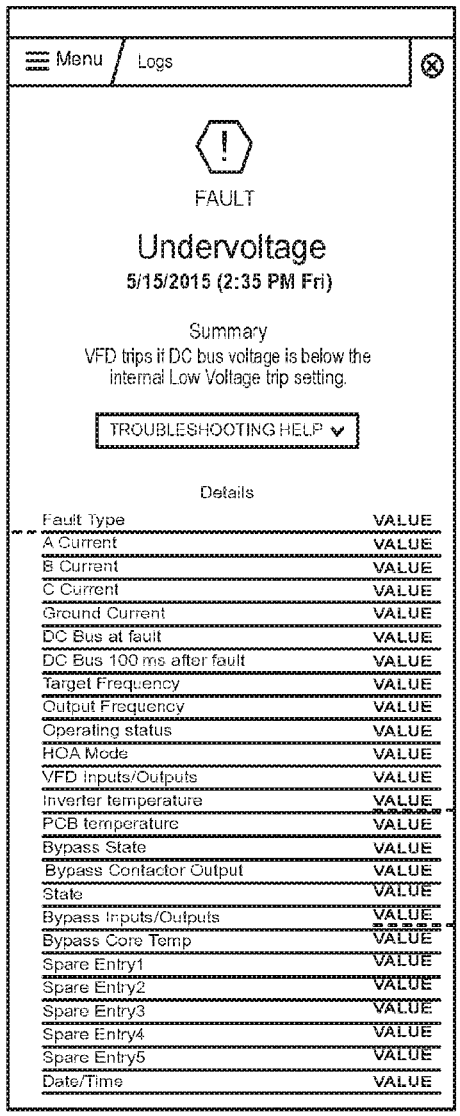
Figure 26B:
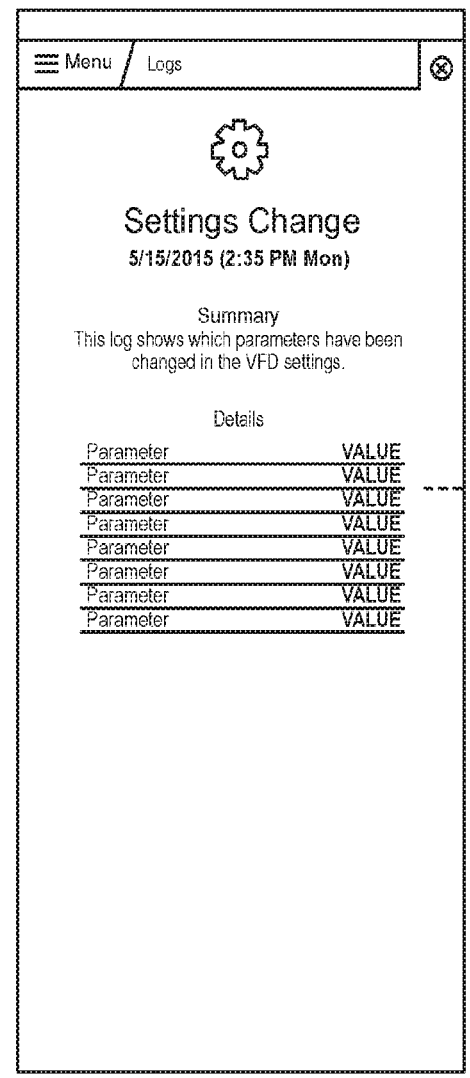
Figure 27A:
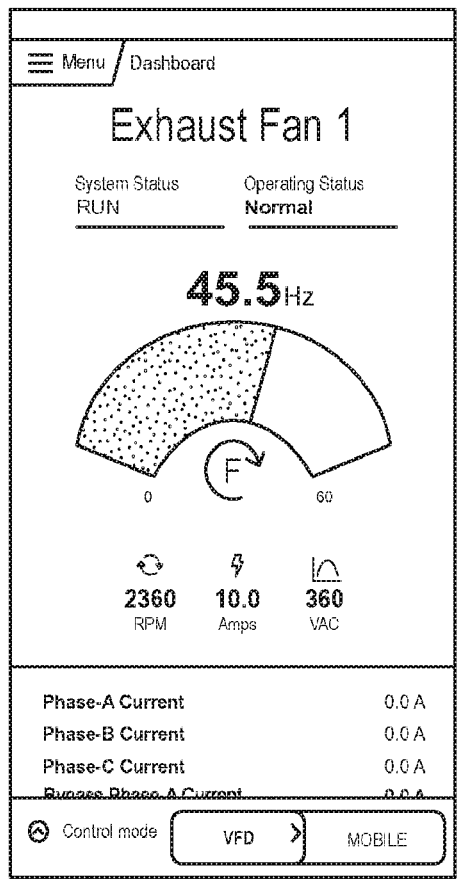
FIGS. 27A and 27B are screenshots of a graphical user interface of a mobile application monitoring dashboard structured to present running values, system status, operating status, and to provide a direct control mode that allows a user to wirelessly and directly control of the motor drive.
Figure 27B:
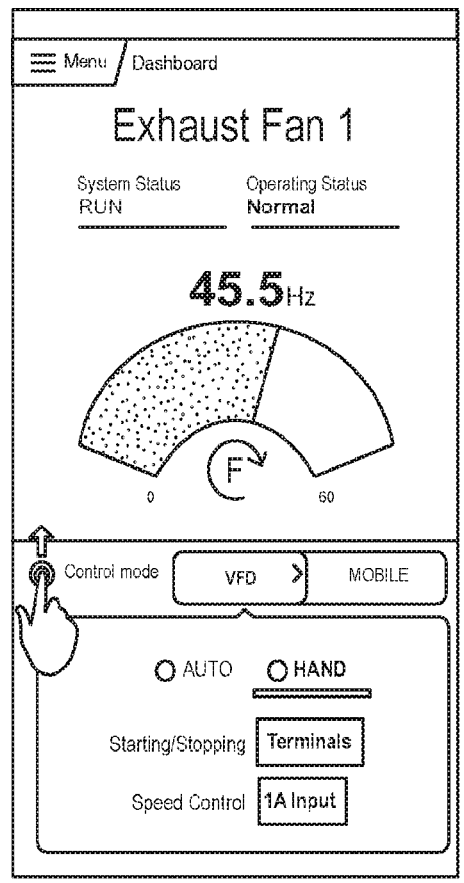
Figure 28A:
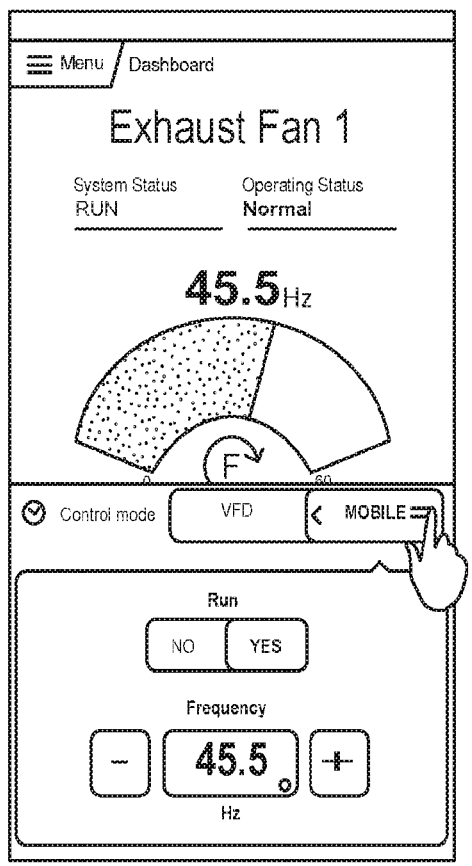
FIGS. 28A and 28B are screenshots of a graphical user interface of a mobile application control module structured to enable the user to directly set the frequency of the motor.
Figure 28B:
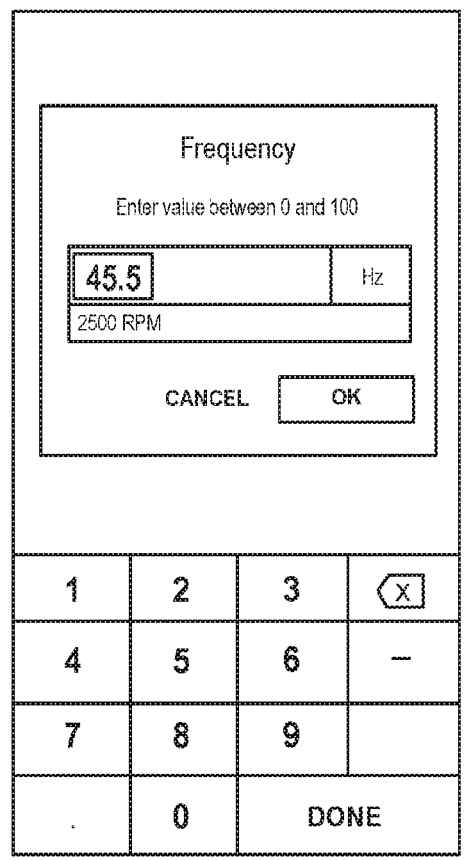

Referring to FIGS. 25A and 25B, the motor drive monitors a multitude of parameters and compares them to various safety parameters provided to protect the motor drive and the motor. The application communicates with the motor drive which transfers information including fault information to the application, where the fault information is recorded in a log. Based on the characteristics of the fault, the application offers troubleshooting help for the customer to use and help solve the problem. Example troubleshooting help includes troubleshooting guides the user can read, and videos the user can view. FIG. 25A illustrates a log summary showing all faults and settings changes, and an upper menu where the user can select to view faults (FIG. 25B) or settings changes. Upon selection of a fault, a log page is displayed (FIG. 25C) and a log pertaining to the fault is emailed to the user at a predetermined email address, and illustrating motor drive parameters at the time the fault occurred, and providing a troubleshooting help button which the user can activate to view troubleshooting help options. The user can select a particular fault or settings change to display related details, as shown in FIGS. 26A and 26B. Logs can be filtered based on the type of log, and a report can be automatically generated that displays the full event log history. If a specific event is selected, a summary of the event, troubleshooting help, and a detailed view of all settings and values at the time of the event are displayed along with time and date stamping 5. Start/Stop and Speed Control The application is able to take local control of the motor drive to allow the user to control functions including start and stop, and change the speed of the motor. As shown in FIGS. 27A and 27B, the application provides page where the user can view the present speed of the motor, current and vacuum level (in a variable torque application). At the bottom of the screenshot in FIG. 27B a slider menu is shown which the user can use to switch control. FIG. 27B illustrates that the user can expand the slider menu to show the present control mode of the motor drive (Auto)/Hand). As shown in FIG. 27B, the motor drive is operating based on start/stop commands received from physical terminals and a speed reference received at an input labeled "1A". Thus the drive is not operating in PID mode but rather following the speed reference. FIGS. 28A and 28B illustrate GUI pages where the user has switched control to the mobile device. The user can start and stop the drive as well as input their desired command frequency. By pressing the plus (+) or minus (−) buttons the user can incrementally adjust the command frequency while the drive is running or stopped. The application provides the user data entry fields where the user can enter a desired speed, e.g. 45.5 Hz, and command the motor drive to run or not.

Unless otherwise expressly stated in connection with a specific use thereof, the term "device" includes a single device, a plurality of devices, two components integrated into a device, and any variations thereof. The singular form is only used to illustrate a particular functionality and not to limit the disclosure to a single component. Therefore, the term "memory device" includes any variation of electronic circuits in which processing instructions executable by a processing device may be embedded unless otherwise expressly stated in connection with the specific use of the term. For example, a memory device includes read only memory, random access memory, a field programmable gate array, a hard-drive, a disk, flash memory, and any combinations thereof, whether physically or electronically coupled. Similarly, a controller includes, for example, a central processing unit, a math processing unit, a plurality of processors on a common integrated circuit, and a plurality of processors operating in concert, whether physically or electronically coupled. Furthermore and in a similar manner, the term "application" includes a single application, a plurality of applications, one or more programs or subroutines, software, firmware, and any variations thereof suitable to execute instruction sequences with a processing device.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A variable frequency drive (VFD) comprising: a controller generating a motor reference voltage; a DC bus providing a DC voltage having a ripple with a ripple cycle; an inverter including power switches operable to convert the DC voltage into an AC motor voltage by modulating the power switches during a plurality of switching cycles, based on the motor reference voltage; and
 a capacitor circuit coupled to the DC bus and having a maximum capacitance that is less than 10 microfarads per ampere of a rated current,
 wherein the controller includes voltage prediction logic structured to detect a voltage value of the DC voltage corresponding to the ripple and to modify the motor reference voltage using the detected voltage value to reduce a total harmonic distortion (THD) of the AC motor voltage^ wherein the voltage prediction logic uses a voltage value of a prior cycle of the DC voltage corresponding to the ripple to predict a voltage value of a subsequent cycle and to modify the motor reference voltage using the predicted voltage value.

2. The VFD of claim 1, wherein modifying the motor reference voltage reduces the THD by at least 50% relative to the AC motor voltage generated without modifying the motor reference voltage.

3. The VFD of claim 1, wherein the voltage prediction logic detects the voltage value of the DC voltage during each of the plurality of switching cycles.

4. The VFD of claim 3, wherein the plurality of switching cycles are consecutive.

5. The VFD of claim 1, wherein the voltage prediction logic detects the voltage value of the DC voltage during consecutive cycles of the ripple.

6. The VFD of claim 5, wherein the VFD is powered by a line voltage having a line frequency, and the ripple cycle is based on a harmonic of the line frequency.

7. The VFD of claim 5, wherein the VFD is powered by a line voltage having a 60 Hz frequency, and a cycle of the ripple has a duration equal to $\frac{1}{360}$ seconds.

8. The VFD of claim 1, wherein the controller includes stabilization logic structured to sum unfiltered q-axis and d-axis currents derived from the AC motor voltage, low-pass filter the summed currents to generate a feedback signal, and modify a q-axis stator voltage based on the feedback signal.

9. The VFD of claim 8, wherein modifying the q-axis stator voltage reduces a current amplitude variation of the AC motor voltage by at least 50% relative to the current amplitude without modifying the q-axis stator voltage.

10. The VFD of claim 1, wherein the capacitor circuit includes all the capacitors coupled to the DC bus.

11. The VFD of claim 1, wherein the controller includes flying-start logic configured to estimate a rotational speed of the motor prior to generating the AC motor voltage to power the motor and to start generating the AC motor voltage at a frequency corresponding to the rotational speed.

12. The VFD of claim 11, wherein the controller generates a reference frequency and ramps-up the frequency of the AC motor voltage to the reference frequency, and wherein the controller monitors the DC voltage and increases the reference frequency if the DC voltage exceeds a voltage threshold.

13. The VFD of claim 11, wherein the controller generates a reference frequency and ramps-up the frequency of the AC motor voltage to the reference frequency, and wherein the controller monitors a current of the motor and decreases the reference frequency of the AC motor voltage if the current exceeds a rated current.

14. The VFD of claim 11, wherein the controller generates a reference frequency and ramps-up the frequency of the AC motor voltage to the reference frequency, wherein the controller monitors the DC voltage and generates a frequency increase adjustment if the DC voltage exceeds a voltage threshold, wherein the controller monitors a current of the motor and generates a frequency decrease adjustment if the current exceeds a rated current, and wherein the controller sums the reference frequency, the frequency increase adjustment, and the frequency decrease adjustment, to generate an updated frequency reference.

15. The VFD of claim 1, wherein the controller is configured to enter a sleep mode of operation in which the inverter does not convert the DC power to the AC power, and wherein the controller is configured to bump the pressure setpoint to determine whether to enter the sleep mode at intervals based on a frequency of the VFD determined prior to bumping the pressure.

16. The VFD of claim 15, wherein the controller is configured with two intervals to bump the pressure setpoint and determine whether to enter the sleep mode, the two intervals comprising different durations and corresponding to two frequency zones.

17. The VFD of claim 16, wherein the controller is configured with a third frequency zone, and wherein the controller is programmed to not to bump the pressure setpoint while in the third frequency zone.

18. The VFD of claim 17, wherein the third frequency zone comprises frequencies higher than frequencies in the two frequency zones.

19. The VFD of claim 17, wherein the third frequency zone comprises frequencies lower than frequencies in the two frequency zones and the controller is configured to automatically enter the sleep mode if the frequency of the VFD is within the third frequency zone for a predetermined time.

20. A method of controlling a variable frequency drive (VFD), the method implemented by a controller and comprising, by the controller:
generating a motor reference voltage;
providing a DC voltage from a DC bus to an inverter, the DC voltage having a ripple with a ripple cycle, wherein a capacitor circuit is coupled to the DC bus and has a maximum capacitance that is less than 10 microfarads per ampere of a rated current;
modulating power switches during a plurality of switching cycles to generate a motor voltage based on the motor reference voltage; and
detecting a voltage value of the DC voltage corresponding to the ripple; and
modifying the motor reference voltage using the detected voltage value to reduce a total harmonic distortion (THD) of the AC motor voltage,
wherein the controller uses a voltage value of a prior cycle of the DC voltage corresponding to the ripple to predict a voltage value of a subsequent cycle and to modify the motor reference voltage using the predicted voltage value.

21. A variable frequency drive (VFD) comprising: a controller generating a motor reference voltage; a DC bus providing a DC voltage having a ripple with a ripple cycle; an inverter including power switches operable to convert the DC voltage into an AC motor voltage by modulating the power switches during a plurality of switching cycles, based on the motor reference voltage; and
a capacitor circuit coupled to the DC bus and having a maximum capacitance that is less than 10 microfarads per ampere of a rated current,
wherein the controller includes voltage prediction logic structured to detect a voltage value of the DC voltage corresponding to the ripple and to modify the motor reference voltage using the detected voltage value to reduce a total harmonic distortion (THD) of the AC motor voltage,
wherein the voltage prediction logic determines a value representing ripple as a proportion of the DC voltage, Vdc, calculated on a switching-cycle basis based on a corresponding value obtained during a prior phase-adjusted period; and multiples the value by a speed reference to adjust the speed reference.

22. A method of controlling a variable frequency drive (VFD), the method implemented by a controller and comprising, by the controller:
generating a motor reference voltage;
providing a DC voltage from a DC bus to an inverter, the DC voltage having a ripple with a ripple cycle, wherein a capacitor circuit is coupled to the DC bus and has a maximum capacitance that is less than 10 microfarads per ampere of a rated current;
modulating power switches during a plurality of switching cycles to generate a motor voltage based on the motor reference voltage; and
detecting a voltage value of the DC voltage corresponding to the ripple; and
modifying the motor reference voltage using the detected voltage value to reduce a total harmonic distortion (THD) of the AC motor voltage,
wherein the controller determines a value representing ripple as a proportion of the DC voltage, Vdc, calculated on a switching-cycle basis based on a corresponding value obtained during a prior phase-adjusted period; and multiples the value by a speed reference to adjust the speed reference.

* * * * *